US012598523B2

(12) United States Patent
Xu et al.

(10) Patent No.: US 12,598,523 B2
(45) Date of Patent: Apr. 7, 2026

(54) LOCATION BASED DATA TRANSMISSION METHOD AND APPARATUS

(71) Applicant: HUAWEI TECHNOLOGIES CO., LTD., Shenzhen (CN)

(72) Inventors: Bin Xu, Beijing (CN); Bingzhao Li, Beijing (CN); Zhenzhen Cao, Boulogne Billancourt (FR); Yan Wang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 377 days.

(21) Appl. No.: 18/344,426

(22) Filed: Jun. 29, 2023

(65) Prior Publication Data

US 2023/0345323 A1      Oct. 26, 2023

Related U.S. Application Data

(63) Continuation of application No. PCT/CN2021/084794, filed on Mar. 31, 2021.

(30) Foreign Application Priority Data

Dec. 31, 2020    (WO) ............... PCT/CN2020/142458

(51) Int. Cl.
| | |
|---|---|
| *H04H 20/71* | (2008.01) |
| *H04W 36/00* | (2009.01) |
| *H04W 36/02* | (2009.01) |

(52) U.S. Cl.
CPC ..... *H04W 36/026* (2013.01); *H04W 36/0007* (2018.08); *H04W 36/0016* (2013.01)

(58) Field of Classification Search
CPC ........... H04W 36/026; H04W 36/0007; H04W 36/0016
See application file for complete search history.

(56) References Cited

U.S. PATENT DOCUMENTS 8,311,010 B1 * 11/2012 Qian ..................... H04L 1/1887
                                                                455/436
12,114,336 B2 * 10/2024 Hong ................ H04W 36/0007
                        (Continued)

FOREIGN PATENT DOCUMENTS

| CN | 108390830 A | 8/2018 |
|---|---|---|
| CN | 110089151 A | 8/2019 |
| CN | 110351794 A | 10/2019 |
| CN | 110972194 A | 4/2020 |
| CN | 111866975 A | 10/2020 |
| CN | 111901766 A | 11/2020 |
| WO | 2018202545 A1 | 11/2018 |

OTHER PUBLICATIONS

3GPP TR 23.757 V1.2.0 (Nov. 2020)"3rd Generation Partnership Project; Technical Specification Group Services and System Aspects; Study on architectural enhancements for 5G multicast-broadcast services (Release 17)" total 293 pages.
(Continued)

*Primary Examiner* — Abdelnabi O Musa
(74) *Attorney, Agent, or Firm* — HAUPTMAN HAM, LLP

(57) ABSTRACT

A data transmission method includes receiving, by a first access network device, local service indication information and a service identifier from a core network device. The local service indication information indicates that a service to which a data packet of a first session belongs is a local service. The data transmission method also includes sending, by the first access network device, third indication information to a second access network device. The third indication information indicates that the service is the local service.

18 Claims, 15 Drawing Sheets

(56) References Cited

U.S. PATENT DOCUMENTS

| | | | |
|---|---|---|---|
| 2015/0023219 A1* | 1/2015 | Jin | H04M 15/93 |
| | | | 370/259 |
| 2016/0330669 A1* | 11/2016 | Li | H04W 28/0257 |
| 2017/0303098 A1* | 10/2017 | Xu | H04W 88/02 |
| 2019/0313295 A1* | 10/2019 | Xu | H04W 88/10 |
| 2019/0349810 A1 | 11/2019 | Cho et al. | |
| 2020/0382986 A1 | 12/2020 | Cakulev et al. | |
| 2022/0053455 A1* | 2/2022 | Baek | H04W 4/08 |
| 2023/0199569 A1* | 6/2023 | Cao | H04W 4/06 |
| | | | 370/331 |
| 2023/0403760 A1* | 12/2023 | Pham Van | H04W 76/40 |
| 2024/0040339 A1* | 2/2024 | Ling | H04W 36/0007 |
| 2024/0049256 A1* | 2/2024 | Zhang | H04L 5/0035 |

OTHER PUBLICATIONS

3GPP TSG-RAN WG3 #110-e E-meeting,R3-206302,"TP on TS 38.300 on MBS service continuity" CATT,Nov. 2-12, 2020,total 11 pages.

Extended European Search Report issued in corresponding European Application No. 21912659.6, dated Mar. 26, 2024, pp. 1-7.

RAN3 Chairman, "List of E-mail Discussions", 3GPP TSG-RAN WG3 #110-e draft R3-206429, Oct. 30, 2020,total 33 pages.

3GPP TS36.300 V16.1.0:"3rd Generation Partnership Project;Technical Specification Group Radio Access Network; Evolved Universal Terrestrial Radio Access (E-UTRA) and Evolved Universal Terrestrial Radio Access Network (E-UTRAN);Overall description;Stage 2(Release 16)",Mar. 2020,total 386 pages.

Qualcomm Inc, "NR Multicast Broadcast mobility enhancements with service continuity", 3GPP TSG-RAN WG2 Meeting #112e R2-2009035, Oct. 13, 2020,total 9 pages.

3GPP TS 38.331 v16.2.0: 3rd Generation Partnership Project;Technical Specification Group Radio Access Network; NR;Radio Resource Control (RRC) protocol specification(Release 16),Sep. 2020,total 921 pages.

Ericsson, "Mobility for NR MBS", 3GPP TSG-RAN WG2 #111e R2-2007628, Oct. 13, 2020,total 4 pages.

International Search Report issued in corresponding International Application No. PCT/CN2020/142458, dated Sep. 6, 2021, pp. 1-10.

International Search Report issued in corresponding International Application No. PCT/CN2021/084794, dated Aug. 27, 2021, pp. 1-11.

* cited by examiner

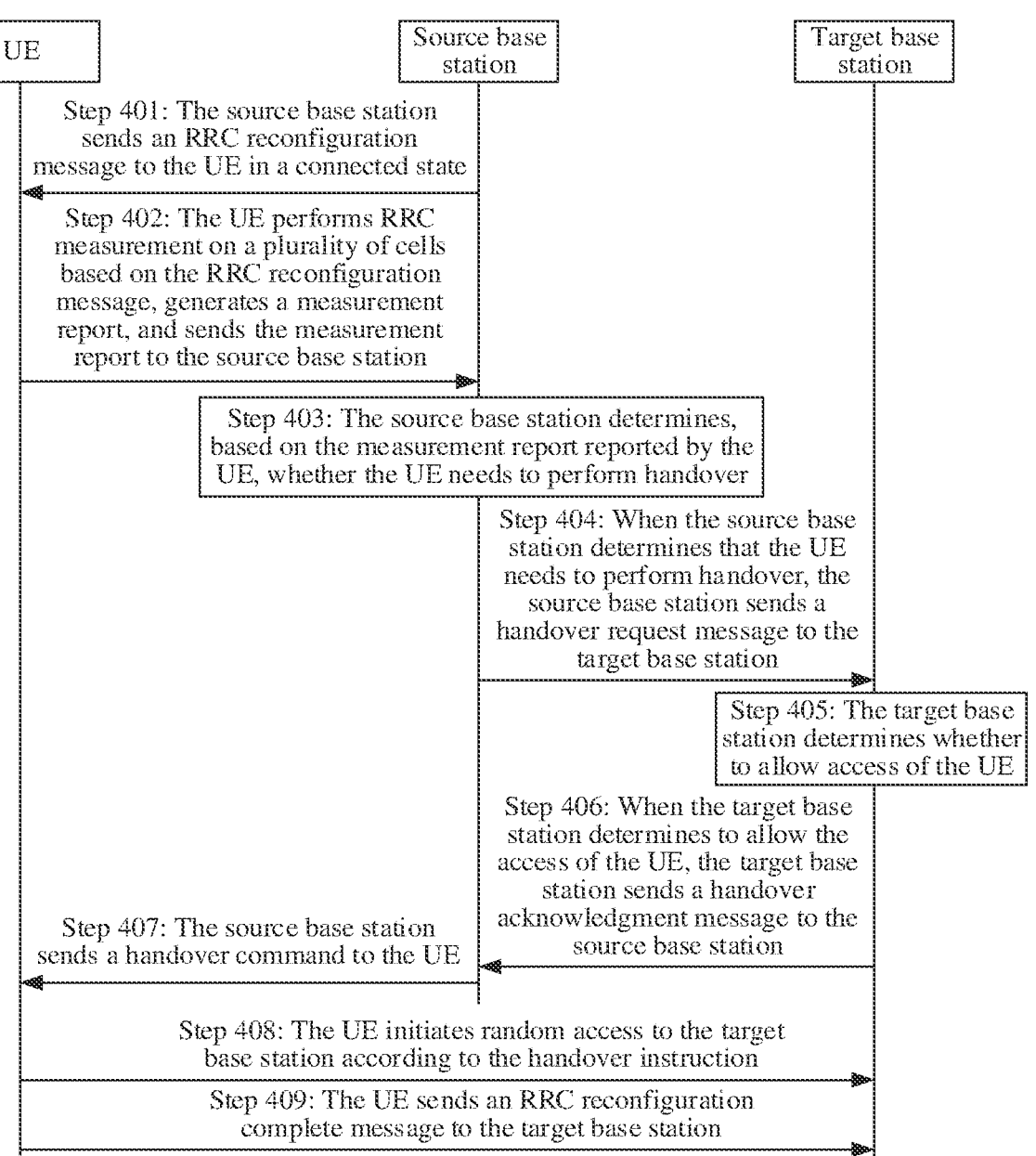

| UE | | Source base station | | Target base station |
|---|---|---|---|---|

Step 401: The source base station sends an RRC reconfiguration message to the UE in a connected state Step 402: The UE performs RRC measurement on a plurality of cells based on the RRC reconfiguration message, generates a measurement report, and sends the measurement report to the source base station Step 403: The source base station determines, based on the measurement report reported by the UE, whether the UE needs to perform handover Step 404: When the source base station determines that the UE needs to perform handover, the source base station sends a handover request message to the target base station Step 405: The target base station determines whether to allow access of the UE Step 406: When the target base station determines to allow the access of the UE, the target base station sends a handover acknowledgment message to the source base station Step 407: The source base station sends a handover command to the UE Step 408: The UE initiates random access to the target base station according to the handover instruction Step 409: The UE sends an RRC reconfiguration complete message to the target base station

FIG. 4

LOCATION BASED DATA TRANSMISSION METHOD AND APPARATUS

CROSS-REFERENCE TO RELATED APPLICATIONS

This application is a continuation of International Application No. PCT/CN2021/084794, filed on Mar. 31, 2021, which claims priority to International Patent Application No. PCT/CN2020/142458, filed on Dec. 31, 2020. The disclosures of the aforementioned applications are hereby incorporated by reference in their entireties.

TECHNICAL FIELD

Embodiments of this application relate to the field of communication technologies, and in particular, to a data transmission method and apparatus.

BACKGROUND

With the rapid development of communication technologies, multicast and broadcast services (MBSs) become increasingly popular. The multicast and broadcast services may provide a plurality of multicast and broadcast services (where the multicast and broadcast services are referred to as MBS services for short, and include a live broadcast service, a public security service, a batch software update service, and the like).

Currently, after obtaining MBS service data from an MBS service server, a core network device sends the MBS service data to a base station by using an MBS session, and then the base station sends the MBS service data to user equipment (UE) by using a radio bearer.

In a transmission process of the MBS service data, when the UE moves, and the UE hands over from a source base station to a target base station, because different base stations may be in different progresses of transmitting an MBS service, service continuity in the handover process of the UE cannot be ensured in a conventional handover manner. Consequently, a data packet of the UE is lost in the handover process.

SUMMARY

Embodiments of this application provide a data transmission method and apparatus, to reduce data packets lost in a handover process of user equipment.

To achieve the foregoing objectives, the following technical solutions are used in embodiments of this application.

According to a first aspect, an embodiment of this application provides a data transmission method, including: A first access network device receives first indication information; the first access network device determines, based on the first indication information, that a mapping relationship from a QoS flow of a first session to a radio bearer is a first mapping relationship; and the first access network device transmits a data packet from the first session based on the first mapping relationship.

In this embodiment of this application, the first access network device determines, according to an indication of the core network device, that the mapping relationship from the QoS flow of the first session to the radio bearer is the first mapping relationship, and transmits the data packet based on the first mapping relationship. This can reduce data packets lost in a handover process of user equipment, so as to provide a better communication service for the user equipment.

In a possible implementation, the first mapping relationship is one-to-one mapping between the QoS flow of the first session and the radio bearer, or mapping between all QoS flows of the first session and a same radio bearer.

In a possible implementation, the transmitting a data packet from the first session based on the first mapping relationship includes: When the first mapping relationship is the one-to-one mapping between the QoS flow of the first session and the radio bearer, the first access network device sets a PDCP serial number of the data packet based on a QFI serial number of the data packet, and sends the data packet. When the first mapping relationship is the mapping between all the QoS flows of the first session and the same radio bearer, the first access network device sets a PDCP serial number of the data packet based on a GTP-U serial number of the data packet, and sends the data packet.

In this embodiment of this application, after the core network device obtains data packets of a service, the core network device adds a core network serial number, for example, a GTP-U serial number, to each data packet, and may add a QFI serial number to each data packet. The core network device may set a GTP-U serial number and/or a QFI serial number for each data packet. Then, the core network device sends the data packet to the access network device, and the access network device receives the data packet, and establishes mapping from a QoS flow of a session to a radio bearer. In other words, the data packet of the QoS flow needs to be transmitted by using the radio bearer to which the QoS flow is mapped. Herein, it is assumed that a radio bearer is in a one-to-one correspondence with a PDCP, and therefore, the PDCP is used to represent the radio bearer. After removing a header including the GTP-U serial number and/or the QFI serial number, the access network device transmits the data packet to a PDCP entity, and the PDCP entity of the access network device sets a PDCP serial number for the data packet. After the data packet is processed by each protocol layer entity based on a corresponding radio bearer, the data packet is sent to the user equipment.

It should be understood that both a source access network device and a target access network device of the user equipment set the PDCP serial number of the data packet according to the method. When the user equipment hands over from the first access network device to a second access network device, because the first access network device and the second access network device set a same PDCP serial number for same data packets in a same QoS flow, and also set a same mapping relationship from the QoS flow to a radio bearer, when the UE hands over between different access network devices, a progress of transmitting the data packet by the access network device may be determined based on the PDCP serial number, and data packets lost in the handover process of the user equipment may be reduced by using a data forwarding technology or a data buffering technology.

Similarly, when the user equipment hands over from the first access network device to a second access network device, because the first access network device and the second access network device set a same PDCP serial number for same data packets in a same session, and also set a same mapping relationship from the QoS flow to a radio bearer, when the UE hands over between different access network devices, a progress of transmitting the data packet by the access network device may be determined based on the PDCP serial number, and data packets lost in the handover process of the user equipment may be reduced by using a data forwarding technology or a data buffering technology.

In a possible implementation, the first mapping relationship is the one-to-one mapping between the QoS flow of the first session and the radio bearer, and the PDCP serial number of the data packet from the first session is equal to the QFI serial number of the data packet, or a difference between the PDCP serial number of the data packet and the QFI serial number of the data packet is a fixed value. Alternatively, the first mapping relationship is the mapping between all the QoS flows of the first session and the same radio bearer, and the PDCP serial number of the data packet from the first session is equal to the GTP-U serial number of the data packet, or a difference between the PDCP serial number of the data packet and the GTP-U serial number of the data packet is a fixed value.

In a possible implementation, the first mapping relationship is the one-to-one mapping between the QoS flow of the first session and the radio bearer, a maximum length of the PDCP serial number of the data packet from the first session is less than a length of the QFI serial number of the data packet, and the PDCP serial number of the data packet satisfies: $A=(B)\bmod(X)$. A represents the PDCP serial number of the data packet, B represents the QFI serial number of the data packet, X represents a maximum value of the PDCP serial number, and mod represents a modulo operation. Alternatively, the first mapping relationship is the mapping between all the QoS flows of the first session and the same radio bearer, a maximum length of the PDCP serial number of the data packet from the first session is less than a length of the GTP-U serial number of the data packet, and the PDCP serial number of the data packet satisfies: $A=(C)\bmod(X)$. A represents the PDCP serial number of the data packet, C represents the GTP-U serial number of the data packet, X represents a maximum value of the PDCP serial number, and mod represents a modulo operation.

The PDCP serial number of the data packet is set according to the foregoing method, so that it can be ensured that the PDCP serial number set based on the QFI serial number does not exceed the maximum value of the PDCP serial number; or it can be ensured that the PDCP serial number set based on the GTP-U serial number does not exceed the maximum value of the PDCP serial number.

In a possible implementation, that the first access network device determines, based on the first indication information, that a mapping relationship from a QoS flow of a first session to a radio bearer is a first mapping relationship includes: The first indication information indicates the first mapping relationship.

Optionally, the first indication information is explicit indication information, and the first indication information may include the first mapping relationship. Alternatively, the first indication information may be an index, and the index indicates the first mapping relationship. The first access network device determines the first mapping relationship based on the index. A correspondence between the index and the first mapping relationship may be preconfigured by the core network device or predefined in a protocol.

In a possible implementation, that the first access network device determines, based on the first indication information, that a mapping relationship from a QoS flow of a first session to a radio bearer is a first mapping relationship includes: The first access network device determines, based on the first indication information, whether the data packet from the first session satisfies a preset condition; and if the data packet satisfies the preset condition, the first access network device determines, based on the first indication information, that the mapping relationship from the QoS flow of the first session to the radio bearer is the first mapping relationship, where the first indication information includes a QoS identifier or a value of a QoS parameter.

It may be understood that, if the first access network device determines, based on the first indication information, that the data packet from the first session satisfies the preset condition, it indicates that lossless transmission or highly reliable transmission needs to be ensured for a service to which the data packet of the first session belongs when the access network device performs handover. In other words, for the service, different access network devices need to set a same PDCP serial number for same data packets of the service. In addition, for the service, the access network device needs to establish the mapping from the QoS flow to the radio bearer based on the first mapping relationship.

Optionally, when the first access network device determines, based on the first indication information, that the data packet from the first session satisfies the preset condition, the first access network device may determine, based on the first indication information, that the mapping relationship from the QoS flow of the first session to the radio bearer is the first mapping relationship in two manners. In one manner, the first indication information includes the first mapping relationship, and the first access network device may obtain the first mapping relationship from the first indication information. In the other manner, the first mapping relationship is predefined in a protocol or preconfigured by the core network device for the access network device. When the first access network device determines, based on the first indication information, that the data packet from the first session satisfies the preset condition, the first access network device determines the first mapping relationship based on the pre-definition in the protocol or the preconfiguration.

Optionally, the first indication information includes the QoS identifier or the value of the QoS parameter, and the QoS identifier or the value of the QoS parameter may be carried in a first session establishment request message.

For content of the first indication information, the preset condition may be that the QoS identifier satisfies a condition or the value of the QoS parameter satisfies a condition. Optionally, the preset condition may be configured for a base station by using the core network device or predefined in a protocol.

In a possible implementation, the QoS identifier includes a 5QI, and the QoS parameter includes at least one of the following: a priority, a packet delay budget, or a packet bit error rate.

For example, the QoS identifier is the 5QI, and the preset condition may be that the 5QI of the data packet is equal to a preset value. For example, the QoS parameter is the priority, and the preset condition may be that the priority is greater than or equal to a preset priority. For example, the QoS parameter is the packet bit error rate, and the preset condition may be that the packet bit error rate of the data packet is less than a preset threshold.

It should be noted that, a value relationship in the preset condition herein is merely an example, and is not strictly limited. For example, a case in which the preset condition is that a QoS parameter is greater than, less than, equal to, greater than or equal to, or less than or equal to a value falls within the protection scope of this embodiment.

In a possible implementation, the data transmission method provided in this embodiment of this application further includes: The first access network device receives second indication information from the core network device, where the second indication information indicates that the service to which the data packet from the first session belongs is a local service.

Optionally, the second indication information may include a service identifier, for example, a service identifier of an MBS service. In addition, optionally, the second indication information may include local service indication information. The local service indication information may indicate whether the service is the local service. The second indication information may alternatively be other indication information. This is not limited in this embodiment of this application. In addition, optionally, the second indication information may also include local area information of the local service, for example, may include a cell identifier (list), a tracking area identifier (list), or a base station identifier (list) included in at least one local area corresponding to the local service.

In a possible implementation, the second indication information further indicates a local area to which the first access network device belongs.

Alternatively, indication information that is sent to the first access network device and that indicates whether the service to which the data packet from the first session belongs is the local service may be different from indication information that indicates the local area to which the first access network device belongs. In other words, two pieces of independent indication information respectively indicate whether the service to which the data packet from the first session belongs is the local service, and indicate the local area to which the first access network device belongs.

In a possible implementation, the data transmission method provided in this embodiment of this application further includes: When the user equipment hands over from the first access network device to the second access network device, the first access network device sends third indication information to the second access network device, where the third indication information indicates that the service to which the data packet from the first session belongs is the local service.

In a possible implementation, the third indication information further indicates the local area to which the first access network device belongs.

In this embodiment of this application, the second access network device determines, based on the third indication information, that the service to which the data packet from the first session belongs is the local service, and the local area to which the first access network device belongs and a local area to which the second access network device belongs are different local areas (that is, the first access network device and the second access network device do not belong to a same local area of a same service). The second access network device may determine that the service is a service that crosses the local area. Therefore, service continuity does not need to be ensured in the handover process of the user equipment, that is, no packet loss does not need to be ensured. In this case, the foregoing data forwarding procedure does not need to be performed, the second access network device does not need to allocate, to the first access network device, forwarding tunnel information used for data forwarding, the second access network device does not need to configure a PDCP status report in a handover request acknowledgment message, and after receiving a handover command, the user equipment does not need to send the PDCP status report to the second access network device.

In this embodiment of this application, the indication information indicates whether the service to which the data packet belongs is the local service or a non-local service, and indicates the local area of the access network device. For the non-local service and local services in a same local area, the service continuity in the handover process of the user equipment is ensured. For the local services in different areas, the service continuity in the handover process of the user equipment does not need to be ensured, so that implementation complexity of the access network device and the user equipment can be reduced.

According to a second aspect, an embodiment of this application provides a data transmission method, including: A core network device generates first indication information, where the first indication information indicates a mapping relationship from a QoS flow of a first session to a radio bearer; and the core network device sends the first indication information to a first access network device. The core network device may indicate, to the access network device, the mapping relationship from the QoS flow of the session to the radio bearer, so that the access network device transmits data based on the indicated mapping relationship. Therefore, in a handover process of UE, data packets lost in the handover process of the user equipment can be reduced, thereby providing a better communication service for the user equipment.

In a possible implementation, the mapping relationship from the QoS flow of the first session to the radio bearer is a first mapping relationship, and the first mapping relationship is one-to-one mapping between the QoS flow of the first session and the radio bearer, or mapping between all QoS flows of the first session and a same radio bearer.

In a possible implementation, the first indication information includes a QoS identifier or a value of a QoS parameter.

In a possible implementation, the QoS identifier includes a 5QI, and the QoS parameter includes at least one of the following: a priority, a packet delay budget, or a packet bit error rate.

In a possible implementation, the data transmission method provided in this embodiment of this application further includes: The core network device obtains a data packet from a data server; the core network device sets a GTP-U serial number and/or a QFI serial number of the data packet; and the core network device sends the data packet to the first access network device by using the first session.

In this embodiment of this application, the core network device uniformly sets GTP-U serial numbers of data packets transmitted by using the first session, and the GTP-U SNs of the data packets belonging to the first session sequentially increase. For the data packets transmitted by using the first session, the core network device uniformly sets the QFI serial numbers of the data packets in each QoS flow based on the QoS flow to which the data packets belong. QFI SNs of data packets in different QoS flows are separately set. In one QoS flow, QFI SNs of data packets belonging to the QoS flow sequentially increase.

In a possible implementation, a service to which the data packet from the first session belongs is a local service, and the first access network device and a second access network device belong to a same local area of a same service. When the core network device sends same data packets to the first access network device and the second access network device, GTP-U serial numbers of the same data packets are the same, and/or QFI serial numbers of the same data packets are the same.

In this embodiment of this application, the core network device determines, based on a quality of service (QoS) requirement of a service to which an obtained data packet belongs, whether lossless transmission or highly reliable transmission of the service needs to be ensured in a moving process of the UE. If the lossless transmission or the highly reliable transmission of the service needs to be ensured in the moving process of the UE, when the core network device sends same data packets to different access network devices, the core network device sets a same GTP-U serial number for the same data packets, and/or sets a same QFI serial number for the same data packets. That is, for a same service (for example, services with a same TMGI), when the core network device sends same data packets to different access network devices, GTP-U serial numbers of the same data packets are the same, and/or QFI serial numbers of the same data packets are the same.

In a possible implementation, the data transmission method provided in this embodiment of this application further includes: The core network device sends second indication information to the first access network device, where the second indication information indicates whether the service to which the data packet from the first session belongs is the local service.

In a possible implementation, the second indication information further indicates a local area to which the first access network device belongs.

In this embodiment of this application, if the service to which the data packet obtained by the core network device belongs is the local service, and different access network devices belong to a same local area of a same service, when sending same data packets to the different access network devices, the core network device sets GTP-U serial numbers of the same data packets to be the same and/or sets QFI serial numbers of the same data packets to be the same.

If the service to which the data packet obtained by the core network device belongs is the local service, and different access network devices do not belong to a same local area of a same service, when the core network device sends same data packets to the different access network devices, there is no need to limit GTP-U serial numbers of the same data packets to be the same, and/or limit QFI serial numbers of the same data packets to be the same. The GTP-U serial numbers of the same data packets may be the same or different, and/or the QFI serial numbers of the same data packets may be the same or different.

For related content and corresponding technical effects of the second aspect, refer to the content and the technical effects of the first aspect. Details are not described herein again.

According to a third aspect, an embodiment of this application provides a first access network device, including a receiving module, a determining module, and a sending module. The receiving module is configured to receive first indication information. The determining module is configured to determine, based on the first indication information, that a mapping relationship from a QoS flow of a first session to a radio bearer is a first mapping relationship. The sending module is configured to transmit a data packet from the first session based on the first mapping relationship.

In a possible implementation, the first mapping relationship is one-to-one mapping between the QoS flow of the first session and the radio bearer, or mapping between all QoS flows of the first session and a same radio bearer.

In a possible implementation, the first access network device further includes a processing module. The processing module is configured to: when the first mapping relationship is the one-to-one mapping between the QoS flow of the first session and the radio bearer, set a PDCP serial number of the data packet based on a QFI serial number of the data packet.

The sending module is configured to send the data packet. The processing module is further configured to: when the first mapping relationship is the mapping between all the QoS flows of the first session and the same radio bearer, set a PDCP serial number of the data based on a GTP-U serial number of the data packet. The sending module is configured to send the data packet.

In a possible implementation, the first mapping relationship is the one-to-one mapping between the QoS flow of the first session and the radio bearer, and the PDCP serial number of the data packet from the first session is equal to the QFI serial number of the data packet, or a difference between the PDCP serial number of the data packet and the QFI serial number of the data packet is a fixed value. Alternatively, the first mapping relationship is the mapping between all the QoS flows of the first session and the same radio bearer, and the PDCP serial number of the data packet from the first session is equal to the GTP-U serial number of the data packet, or a difference between the PDCP serial number of the data packet and the GTP-U serial number of the data packet is a fixed value.

In a possible implementation, the first mapping relationship is the one-to-one mapping between the QoS flow of the first session and the radio bearer, a maximum length of the PDCP serial number of the data packet from the first session is less than a length of the QFI serial number of the data packet, and the PDCP serial number of the data packet satisfies: $A=(B)\bmod(X)$. A represents the PDCP serial number of the data packet, B represents the QFI serial number of the data packet, X represents a maximum value of the PDCP serial number, and mod represents a modulo operation. Alternatively, the first mapping relationship is the mapping between all the QoS flows of the first session and the same radio bearer, a maximum length of the PDCP serial number of the data packet from the first session is less than a length of the GTP-U serial number of the data packet, and the PDCP serial number of the data packet satisfies: $A=(C)\bmod(X)$. A represents the PDCP serial number of the data packet, C represents the GTP-U serial number of the data packet, X represents a maximum value of the PDCP serial number, and mod represents a modulo operation.

In a possible implementation, that the first access network device determines, based on the first indication information, that a mapping relationship from a QoS flow of a first session to a radio bearer is a first mapping relationship includes: The first indication information indicates the first mapping relationship.

In a possible implementation, that the first access network device determines, based on the first indication information, that a mapping relationship from a QoS flow of a first session to a radio bearer is a first mapping relationship includes: The first access network device determines, based on the first indication information, whether the data packet satisfies a preset condition; and if the data packet satisfies the preset condition, the first access network device determines, based on the first indication information, that the mapping relationship from the QoS flow of the first session to the radio bearer is the first mapping relationship, where the first indication information includes a QoS identifier or a value of a QoS parameter.

In a possible implementation, the QoS identifier includes a 5G quality of service identifier 5QI, and the QoS parameter includes at least one of the following: a priority, a packet delay budget, or a packet bit error rate.

In a possible implementation, the receiving module is further configured to receive second indication information from the core network device, where the second indication information indicates that a service to which the data packet from the first session belongs is a local service.

In a possible implementation, the second indication information further indicates a local area to which the first access network device belongs.

In a possible implementation, the sending module is further configured to: when the user equipment hands over from the first access network device to a second access network device, send third indication information to the second access network device, where the third indication information indicates that the service to which the data packet from the first session belongs is the local service.

In a possible implementation, the third indication information further indicates the local area to which the first access network device belongs.

According to a fourth aspect, an embodiment of this application provides a core network device, including a generation module and a sending module. The generation module is configured to generate first indication information, where the first indication information indicates a mapping relationship from a QoS flow of a first session to a radio bearer. The sending module is configured to send the first indication information to a first access network device.

In a possible implementation, the mapping relationship from the QoS flow of the first session to the radio bearer is a first mapping relationship, and the first mapping relationship is one-to-one mapping between the QoS flow of the first session and the radio bearer, or mapping between all QoS flows of the first session and a same radio bearer.

In a possible implementation, the first indication information includes a QoS identifier or a value of a QoS parameter.

In a possible implementation, the QoS identifier includes a 5QI, and the QoS parameter includes at least one of the following: a priority, a packet delay budget, or a packet bit error rate.

In a possible implementation, the core network device further includes an obtaining module and a processing module. The obtaining module is configured to obtain a data packet from a data server. The processing module is configured to set a GTP-U serial number and/or a QFI serial number of the data packet. The sending module is further configured to send the data packet to the first access network device by using the first session.

In a possible implementation, a service to which the data packet from the first session belongs is a local service, and the first access network device and a second access network device belong to a same local area of a same service. When the core network device sends same data packets to the first access network device and the second access network device, GTP-U serial numbers of the same data packets are the same, and/or QFI serial numbers of the same data packets are the same.

In a possible implementation, the sending module is further configured to send second indication information to the first access network device, where the second indication information indicates whether the service to which the data packet from the first session belongs is the local service.

In a possible implementation, the second indication information further indicates a local area to which the first access network device belongs.

According to a fifth aspect, an embodiment of this application provides a communication apparatus, including at least one processor. After reading instructions stored in a memory, the at least one processor performs the method according to any one of the first aspect or the possible implementations of the first aspect.

According to a sixth aspect, an embodiment of this application provides a computer-readable storage medium. The computer-readable storage medium includes a computer program. When the computer program is run on a computer, the method according to any one of the first aspect and the possible implementations of the first aspect is performed.

According to a seventh aspect, an embodiment of this application provides a computer program product including instructions. When the computer program product runs on a computer, the computer is enabled to perform the method according to any one of the first aspect and the possible implementations of the first aspect.

According to an eighth aspect, an embodiment of this application provides a chip, including a memory and a processor. The memory is configured to store computer instructions. The processor is configured to invoke the computer instructions from the memory and run the computer instructions, to perform the method according to any one of the first aspect and the possible implementations of the first aspect.

According to a ninth aspect, an embodiment of this application provides a communication apparatus, including at least one processor. After reading instructions stored in a memory, the at least one processor performs the method according to any one of the second aspect or the possible implementations of the second aspect.

According to a tenth aspect, an embodiment of this application provides a computer-readable storage medium. The computer-readable storage medium includes a computer program. When the computer program is run on a computer, the method according to any one of the second aspect and the possible implementations of the second aspect is performed.

According to an eleventh aspect, an embodiment of this application provides a computer program product including instructions. When the computer program product runs on a computer, the computer is enabled to perform the method according to any one of the second aspect and the possible implementations of the second aspect.

According to a twelfth aspect, an embodiment of this application provides a chip, including a memory and a processor. The memory is configured to store computer instructions. The processor is configured to invoke the computer instructions from the memory and run the computer instructions, to perform the method according to any one of the second aspect and the possible implementations of the second aspect.

According to a thirteenth aspect, an embodiment of this application provides a communication system, including the first access network device according to the third aspect or the first access network device according to the fifth aspect, the core network device according to the fourth aspect or the core network device according to the ninth aspect, a second access network device, and user equipment.

It should be understood that for beneficial effects achieved by technical solutions of the third aspect to the thirteenth aspect and the corresponding possible implementations in embodiments of this application, refer to the foregoing technical effects of the first aspect and the second aspect and the corresponding possible implementations thereof. Details are not described herein again.

According to a fourteenth aspect, an embodiment of this application provides a data transmission method, including: A first access network device receives first indication information; the first access network device determines configuration information of a first radio bearer based on the first indication information; and the first access network device transmits a data packet of the first radio bearer based on the configuration information. Any access network device in a communication system transmits a data packet according to the data transmission method provided in this embodiment of this application, so that data packets lost in a handover process of user equipment can be reduced, thereby providing a better communication service for the user equipment.

In this embodiment of this application, after a core network device establishes a first session, the core network device sends a data packet to the first access network device by using the first session. The data packet of the first session is mapped to the first radio bearer, that is, is transmitted by using the first radio bearer. It may be understood that the first access network device needs to establish the first radio bearer or configure the first radio bearer based on the configuration information of the first radio bearer.

It should be understood that transmitting a data packet may include at least one of sending a data packet, receiving a data packet, processing a data packet before sending the data packet, or processing a data packet after receiving the data packet. The data packet of the first radio bearer refers to a data packet transmitted by using the first radio bearer.

It should be understood that "performing transmission based on the configuration information" may be understood as that the data packet needs to be processed based on the configuration information when the data packet is transmitted by using the first radio bearer.

In a possible implementation, the configuration information of the first radio bearer includes at least one of the following: a length of a PDCP serial number, PDCP header compression configuration information, security configuration information, PDCP status reporting configuration information, a length of a PDCP discard timer, a PDCP reordering window parameter value, PDCP reestablishment configuration information, or PDCP data recovery configuration information.

The length of the PDCP serial number indicates a quantity of bits occupied by the PDCP serial number, and the length of the PDPC serial number determines a value range of the PDCP serial number and a format of a PDCP PDU.

The PDCP header compression configuration information is configuration information used for performing PDCP compression on a data packet when the data packet is processed at a PDCP layer. The PDCP header compression configuration information may include configuration information about whether to enable a header compression function, a maximum quantity of contexts, profile information for PDCP header compression, information indicating whether to continue to perform a header compression protocol or resetting header compression in a case of PDCP reestablishment, and the like.

The security configuration information may include information such as whether to enable a security function (for example, whether to perform an encryption and decryption process, and whether to enable an integrity protection process and an integrity verification process), a key to be used, and a security algorithm to be executed.

The PDCP status reporting configuration information may include whether to enable status reporting. If the status reporting is to be enabled, the user equipment sends a PDCP status report to the access network device during PDCP reestablishment, PTP handover, and PTM handover, or when the access network device needs to obtain the PDCP status report.

The length of the PDCP discard timer is timing duration of the discard timer. After a PDCP entity receives a PDCP SDU from an upper layer, the PDCP entity starts the discard timer. When the discard timer expires, the PDCP entity discards the PDCP SDU.

The PDCP reordering window parameter value may include at least one of a size of a reordering window, a length of a reordering timer, an upper boundary of the reordering window, and a lower boundary of the reordering window.

The PDCP reestablishment configuration information indicates whether to perform the PDCP reestablishment. If the PDCP reestablishment configuration information is that the PDCP reestablishment is not allowed, the user equipment does not perform a corresponding operation in a process in which the user equipment hands over from one access network device to another access network device.

The PDCP data recovery configuration information indicates whether to perform PDCP recovery. If the PDCP data recovery configuration information indicates that the PDCP recovery is not allowed, the user equipment does not perform a corresponding operation in a process in which the user equipment hands over from one access network device to another access network device.

In a possible implementation, a method for determining, by the first access network device, configuration information of a first radio bearer based on the first indication information includes: The first indication information carries the configuration information of the first radio bearer.

Optionally, the first indication information is explicit indication information, and the first indication information includes a first mapping relationship. Alternatively, the first indication information is an index, and the index indicates the first mapping relationship. The first access network device determines the first mapping relationship based on the index. A correspondence between the index and the first mapping relationship may be preconfigured by the core network device or predefined in a protocol.

In a possible implementation, a method for determining, by the first access network device, configuration information of a first radio bearer based on the first indication information includes: The first access network device determines that the first indication information satisfies a preset condition, and the first access network device determines that the configuration information of the first radio bearer is first configuration information. The first indication information includes at least one of the following: a QoS text, a QoS identifier, or a value of a QoS parameter.

Optionally, if the first indication information does not satisfy the preset condition, the first access network device does not need to determine the configuration information of the first radio bearer as the first configuration information. In this case, the first access network device may determine the configuration information of the first radio bearer by using another method (which may be an existing algorithm).

Optionally, in this embodiment of this application, the first configuration information may be configuration information specified in a protocol, or configuration information that is received by the first access network device in advance from the core network device or another access network device. This is not limited in this embodiment of this application.

In a possible implementation, the QoS identifier includes a 5G quality of service identifier 5QI, and the QoS parameter includes at least one of the following: a resource type, a priority, a maximum data burst volume, a packet delay budget, or a packet bit error rate.

In a possible implementation, a method for determining, by the first access network device, configuration information of a first radio bearer based on the first indication information may include: The first access network device determines a preset condition that the first indication information satisfies. For example, if the first indication information satisfies a preset condition 1, the first access network device determines that the configuration information of the first radio bearer is the first configuration information, if the first indication information satisfies a preset condition 2, the first access network device determines that the configuration information of the first radio bearer is second configuration information, and so on. In this case, there is a correspondence between the preset condition and the configuration information of the first radio bearer.

Optionally, in this embodiment of this application, the first configuration information and the second configuration information may be configuration information specified in a protocol, or configuration information that is received by the first access network device in advance from the core network device or another access network device. This is not limited in this embodiment of this application.

According to a fifteenth aspect, an embodiment of this application provides a data transmission method, including: A core network device generates first indication information, where the first indication information indicates configuration information of a first radio bearer; and the core network device sends the first indication information to a first access network device. The core network device may indicate the configuration information of the first radio bearer to an access network device, so that the access device transmits data based on the configuration information. Therefore, in a handover process of UE, data packets lost in the handover process of the user equipment can be reduced, thereby providing a better communication service for the user equipment.

In a possible implementation, the configuration information of the first radio bearer includes at least one of the following: a length of a PDCP serial number, PDCP header compression configuration information, security configuration information, PDCP status reporting configuration information, a length of a PDCP discard timer, a PDCP reordering window parameter value, PDCP reestablishment configuration information, or PDCP data recovery configuration information.

In a possible implementation, the first indication information carries the configuration information of the first radio bearer.

In a possible implementation, the first indication information includes at least one of the following: a QoS text, a QoS identifier, or a value of a QoS parameter. The QoS identifier includes a 5G quality of service identifier 5QI, and the QoS parameter includes at least one of the following: a resource type, a priority, a maximum data burst volume, a packet delay budget, or a packet bit error rate.

In a possible implementation, before the core network device sends the first indication information to the first access network device, the data transmission method provided in this embodiment of this application further includes: The core network device receives second indication information from a second access network device, where the second indication information indicates configuration information of a radio bearer of the second access network device.

In a possible implementation, a method for generating first indication information by a core network device includes: The core network device generates the first indication information based on the second indication information. According to the foregoing method, the configuration information of the radio bearer of the first access network device can be the same as the configuration information of the radio bearer of the second access network device. In this way, when the user equipment hands over between the first access network device and the second access network device, data can be forwarded based on transmission progresses of different access network devices, so that lost data packets are reduced, thereby providing a better communication service for the user equipment.

According to a sixteenth aspect, an embodiment of this application provides an access network device, including a receiving module, a determining module, and a sending module. The receiving module is configured to receive first indication information. The determining module is configured to determine configuration information of a first radio bearer based on the first indication information. The sending module is configured to transmit a data packet of the first radio bearer based on the configuration information.

In a possible implementation, the configuration information of the first radio bearer includes at least one of the following: a length of a PDCP serial number, PDCP header compression configuration information, security configuration information, PDCP status reporting configuration information, a length of a PDCP discard timer, a PDCP reordering window parameter value, PDCP reestablishment configuration information, or PDCP data recovery configuration information.

According to a seventeenth aspect, an embodiment of this application provides a core network device, including a generation module and a sending module. The generation module is configured to generate first indication information, where the first indication information indicates configuration information of a first radio bearer. The sending module is configured to send the first indication information to a first access network device.

In a possible implementation, the core network device provided in this embodiment of this application further includes a receiving module. The receiving module is configured to receive second indication information from a second access network device, where the second indication information indicates configuration information of a radio bearer of the second access network device. The generation module is configured to generate the first indication information based on the second indication information.

According to an eighteenth aspect, an embodiment of this application provides a communication apparatus, including at least one processor. After reading instructions stored in a memory, the at least one processor performs the method according to any one of the fourteenth aspect and the possible implementations of the fourteenth aspect.

According to a nineteenth aspect, an embodiment of this application provides a computer-readable storage medium. The computer-readable storage medium includes a computer program. When the computer program is run on a computer, the method according to any one of the fourteenth aspect and the possible implementations of the fourteenth aspect is performed.

According to a twentieth aspect, an embodiment of this application provides a computer program product including instructions. When the computer program product runs on a computer, the computer is enabled to perform the method according to any one of the fourteenth aspect and the possible implementations of the fourteenth aspect.

According to a twenty-first aspect, an embodiment of this application provides a chip, including a memory and a processor. The memory is configured to store computer instructions. The processor is configured to invoke the computer instructions from the memory and run the computer instructions, to perform the method according to any one of the fourteenth aspect and the possible implementations of the fourteenth aspect.

According to a twenty-second aspect, an embodiment of this application provides a communication apparatus, including at least one processor. After reading instructions stored in a memory, the at least one processor performs the method according to any one of the fifteenth aspect and the possible implementations of the fifteenth aspect.

According to a twenty-third aspect, an embodiment of this application provides a computer-readable storage medium. The computer-readable storage medium includes a computer program. When the computer program is run on a computer, the method according to any one of the fifteenth aspect and the possible implementations of the fifteenth aspect is performed.

According to a twenty-fourth aspect, an embodiment of this application provides a computer program product including instructions. When the computer program product runs on a computer, the computer is enabled to perform the method according to any one of the fifteenth aspect and the possible implementations of the fifteenth aspect.

According to a twenty-fifth aspect, an embodiment of this application provides a chip, including a memory and a processor. The memory is configured to store computer instructions. The processor is configured to invoke the computer instructions from the memory and run the computer instructions, to perform the method according to any one of the fifteenth aspect and the possible implementations of the fifteenth aspect.

According to a twenty-sixth aspect, an embodiment of this application provides a communication system, including the first access network device according to the sixteenth aspect or the first access network device according to the eighteenth aspect, the core network device according to the seventeenth aspect or the core network device according to the twenty-second aspect, a second access network device, and user equipment.

It should be understood that for beneficial effects achieved by technical solutions of the sixteenth aspect to the twenty-sixth aspect and the corresponding possible implementations in embodiments of this application, refer to the foregoing technical effects of the fourteenth aspect and the fifteenth aspect and the corresponding possible implementations thereof. Details are not described herein again.

BRIEF DESCRIPTION OF DRAWINGS

FIG. 4 is a schematic diagram of a method for a UE handover process according to an embodiment of this application;

DESCRIPTION OF EMBODIMENTS

The term "and/or" in this specification describes only an association relationship for describing associated objects and represents that three relationships may exist. For example, A and/or B may represent the following three cases: Only A exists, both A and B exist, and only B exists.

In the specification and claims in embodiments of this application, the terms "first", "second", and so on are intended to distinguish between different objects but do not indicate a particular order of the objects. For example, a first access network device and a second access network device are used to distinguish between different access network devices, but are not used to describe a specific order of the access network devices. First indication information, second indication information, third indication information, and the like are used to distinguish between different indication information, but are not used to describe a specific order of the indication information.

In embodiments of this application, the word "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the word such as "example" or "for example" is intended to present a relative concept in a specific manner.

In the descriptions of embodiments of this application, unless otherwise stated, "a plurality of" means two or more than two. For example, a plurality of processing units are two or more processing units, and a plurality of systems are two or more systems.

First, some concepts related to a data transmission method and apparatus provided in embodiments of this application are described.

Figure 1:
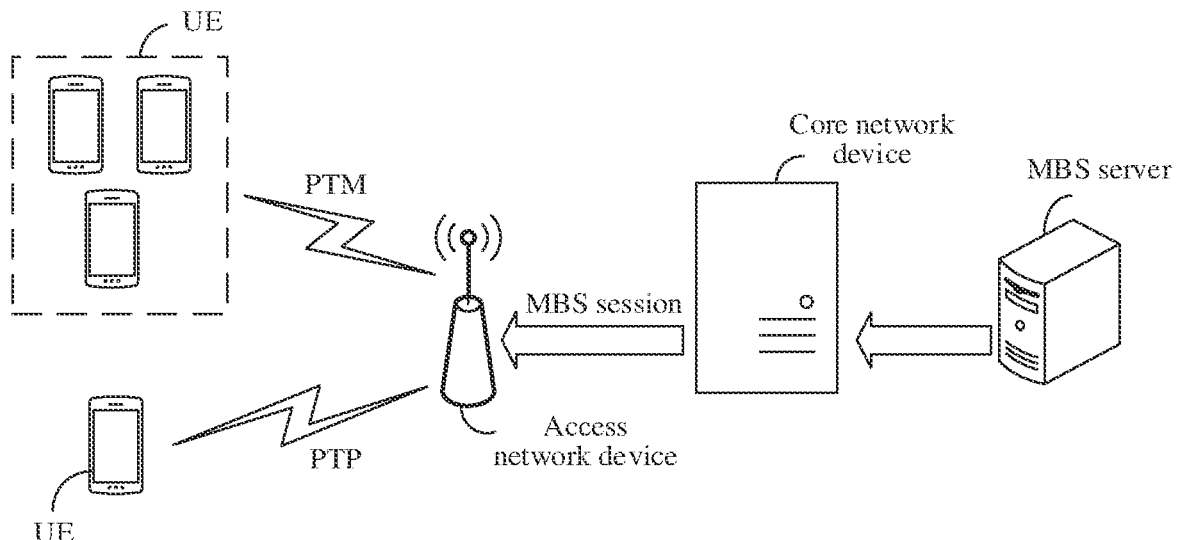
FIG. 1 is a schematic diagram of a transmission process of an MBS service according to an embodiment of this application.

Multicast and broadcast service (MBS service): The multicast and broadcast service is a service oriented to a plurality of UEs. Common MBS services include a live broadcast service, a public security service, and a batch software update service. Refer to FIG. 1. A data transmission process of the MBS service includes: A core network device obtains MBS service data from an MBS server (a server that generates the MBS service data), and then the core network device sends the MBS service data to an access network device by using an MBS session established between the core network device and the access network device (for example, a base station), so that the access network device sends the same MBS service data to a plurality of UEs.

Optionally, a transmission manner of the MBS service data (that is, a manner in which the access network device sends the MBS service data to the plurality of UEs) may be a point-to-multipoint (PTM) transmission manner or a point-to-point (PTP) transmission manner.

It is understandable that the MBS services may be classified into local MBS services and non-local MBS services. The non-local service refers to that content of the MBS services is the same in all areas. The local MBS service refers to a service valid in a specific local area. For MBS services with a same service identifier (which may be referred to as same MBS services), content of the MBS services may be different in different areas, and service data of the MBS services in the different areas may be provided by different MBS servers. For example, some V2X services and public security services are local MBS services. The service identifier of the MBS service may be a temporary multicast group identifier (TMGI).

Figure 2:
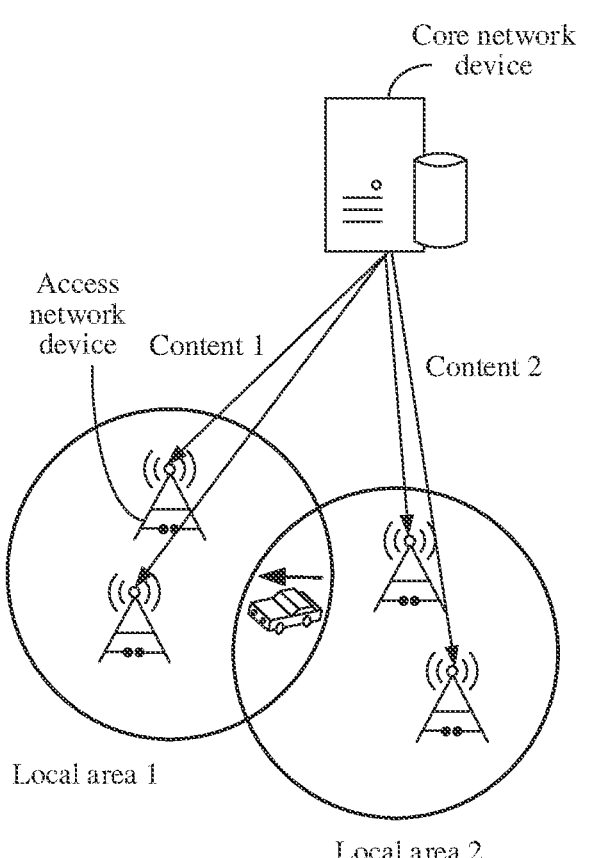
FIG. 2 is a schematic diagram of a local MBS service according to an embodiment of this application.

For example, refer to FIG. 2. For local V2X services with a same service identifier (TMGI), content broadcast in a local area 1 is different from content broadcast in a local area 2. Sometimes, for the local V2X services with the same service identifier, content (content 1 in FIG. 2) corresponding to a V2X service in the local area 1 is different from content (content 2 in FIG. 2) corresponding to a V2X service in the local area 2. For example, when a vehicle in FIG. 2 travels from the local area 2 to the local area 1, when the vehicle travels to the local area 2 and does not enter the local area 1, content that is of an MBS service and that is received by the vehicle is the content 2. When the vehicle travels to an overlapping area of the local area 1 and the local area 2, the vehicle may receive both the content 1 and the content 2. When the vehicle travels to the local area 1 and moves out of the local area 2, the content that is of the MBS service and that is received by the vehicle is the content 1.

Radio access network side protocol stack: UE on a radio access network side and an access network device have protocol stacks. The UE communicates with the access network device based on the protocol stacks. The protocol stacks include control plane protocol stacks and user plane protocol stacks.

In the user plane protocol stacks, structures of the protocol stacks of the UE and the access network device each include a radio resource control (RRC) layer, a service data adaptation (SDAP) layer, a packet data convergence protocol (PDCP) layer, a radio link control (RLC) layer, a media access control (MAC) layer, and a physical layer (PHY-layer). The physical layer is located at the bottom layer and belongs to layer 1. The SDAP layer, the PDCP layer, the RLC layer, and the MAC layer belong to the second layer (layer 2). The RRC layer belongs to the third layer (layer 3).

Figure 3:
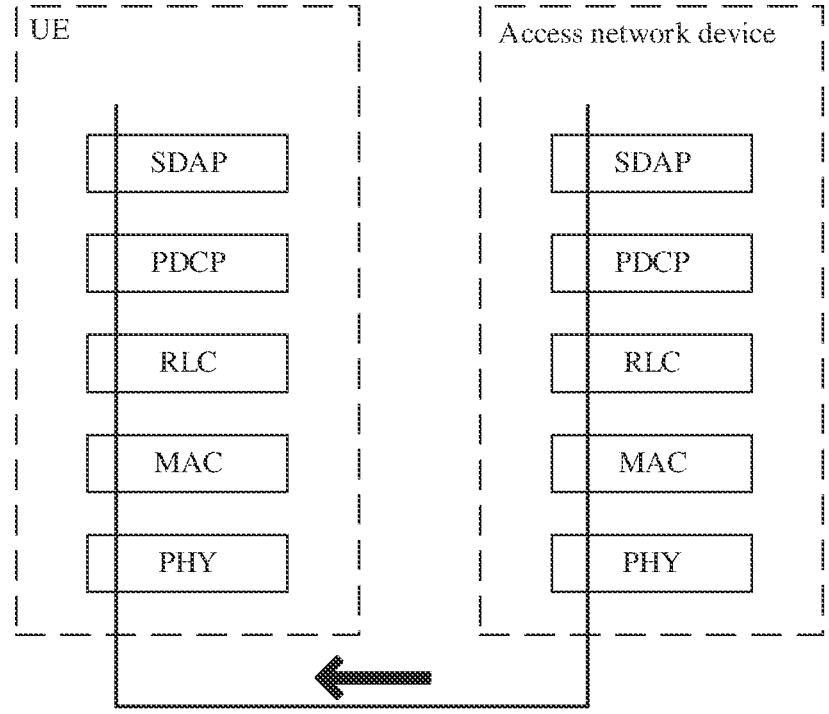
FIG. 3 is a schematic structural diagram of a user plane protocol stack according to an embodiment of this application.

FIG. 3 is a schematic structural diagram of user plane protocol stacks. It should be noted that FIG. 3 shows only structures of layers 2 and layers 1 of the user plane protocol stacks, and layers 3 are not shown. A transmission direction shown by an arrow in FIG. 3 is a data transmission direction of an MBS service, that is, a schematic diagram of a process in which an access network device sends data to UE.

With reference to FIG. 3, on an access network device side, after data arrives at the SDAP layer of the access network device, and mapping from a QoS flow of a service to a radio bearer is completed by using the SDAP layer, the data is transmitted to the PDCP layer, and after being processed (where the processing includes, for example, header compression, encryption, and integrity protection) by the PDCP layer, the data is sequentially transmitted to the RLC layer and the MAC layer, and correspondingly processed at the RLC layer and the MAC layer. In this case, the data is sent from the physical layer (PHY layer) and is transmitted to the UE side through an air interface. Then, the protocol layers of the UE sequentially perform corresponding processing on the data in a processing order opposite to that of the access network device.

It should be understood that each protocol layer of the access network device and the UE corresponds to a functional entity, and each protocol layer corresponds to one or more functional entities. In this case, a function of each protocol layer is implemented by a functional entity corresponding to the protocol layer. For example, a functional entity corresponding to the PDCP layer is a PDCP entity.

Radio bearer: When the access network device communicates with the UE, the radio bearer needs to be established, so as to transmit a message or data by using the radio bearer. Refer to FIG. 3. Processing on a data packet by the protocol layers of the access network device and the UE may be collectively referred to as a radio bearer. It should be understood that the radio bearer is divided based on a PDCP entity. That is, one radio bearer includes one PDCP entity. For example, if two PDCP entities are established at the PDCP layer, the PDCP entity corresponds to two radio bearers. One radio bearer may include at least one RLC entity, and one RLC entity corresponds to one logical channel.

Handover technology: Handover refers to that in a process in which the UE communicates with the access network device (for example, a base station), because the UE moves, a source base station cannot provide a service that meets a requirement of the UE for the UE, and the UE needs to disconnect from the source base station, and then establish a connection to a target base station. Subsequently, the target base station provides the service for the UE. This process is referred to as that the UE needs to hand over from the source base station to the target base station.

Refer to FIG. 4. The process in which the UE hands over from the source base station to the target base station includes step 401 to step 409.

Step 401: The source base station sends an RRC reconfiguration message (RRCReconfigration) to the UE in a connected state.

The RRC reconfiguration message includes information such as a measurement object, measurement report configuration information, and a measurement identifier.

Step 402: The UE performs RRC measurement on a plurality of cells based on the RRC reconfiguration message, generates a measurement report (measure report), and sends the measurement report to the source base station.

It should be understood that the measurement report includes indicator data such as signal strength and signal received power.

Step 403: The source base station determines, based on the measurement report reported by the UE, whether the UE needs to perform handover (handover decision).

Step 404: When the source base station determines that the UE needs to perform handover, the source base station sends a handover request message (handover request) to the target base station.

Step 405: The target base station determines whether to allow access of the UE (admission control).

Optionally, the target base station may determine, based on a status such as a quantity of connections of the target base station, whether to allow the access of the UE. For example, if the quantity of connections of the target base station is small, the target base station allows the access of the UE; or if the quantity of connections of the target base station is large, the target base station cannot provide a service for the UE, and the target base station does not allow the access of the UE.

Step 406: When the target base station determines to allow the access of the UE, the target base station sends a handover acknowledgment message (handover request ACK) to the source base station.

The handover acknowledgment message includes information about a target cell to be accessed by the UE and some configuration parameters required by the UE to access the target cell. The information about the target cell includes a physical cell identifier (PCI) of the target cell, and frequency information corresponding to the target cell, for example, a frequency corresponding to the target cell. For content of frequency information of a cell in an NR system, refer to descriptions of FrequencyInfoDL IE in the protocol TS38331. The configuration parameters required by the UE to access the target cell may further include RACH resource information (for example, a dedicated RACH resource and/or a RACH resource) required by the UE to access the target cell.

Step 407: The source base station sends a handover command to the UE.

The handover command may be sent by using an RRC reconfiguration message. The handover command includes the information about the target cell and the some configuration parameters required for the UE to access the target cell.

Step 408: The UE initiates random access to the target base station according to the handover instruction.

Step 409: The UE sends an RRC reconfiguration complete message (RRCReconifiguration complete) to the target base station.

It may be understood that, in a handover process of the UE, the UE disconnects from the source base station, and before the UE successfully accesses the target base station, data receiving and sending of the UE may be temporarily interrupted.

Figure 5:
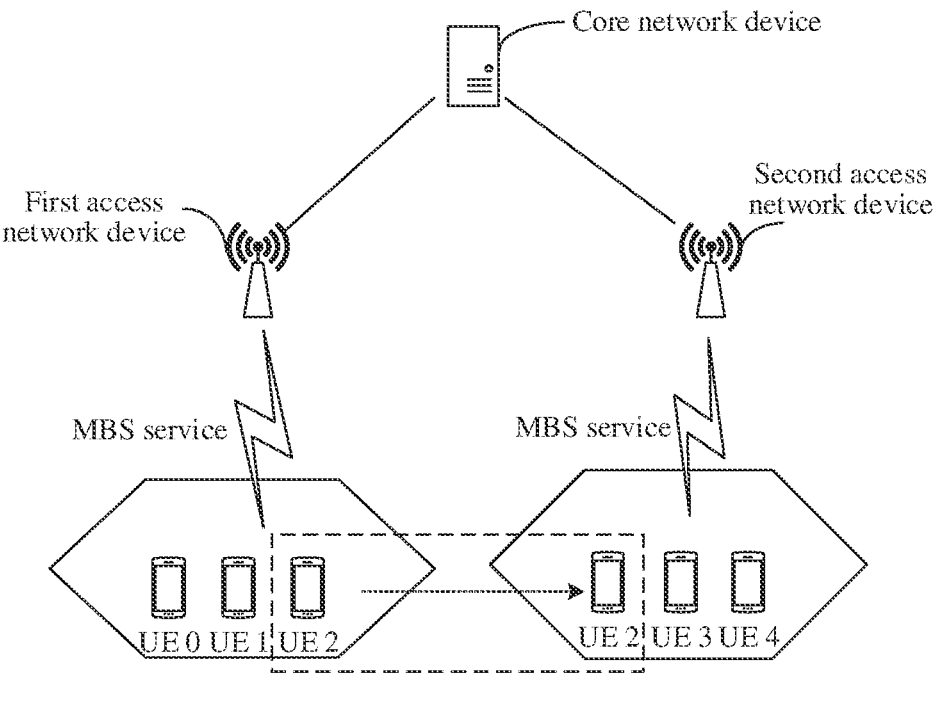
FIG. 5 is a schematic diagram of UE handover according to an embodiment of this application.

It should be understood that UE handover may also occur in the foregoing data transmission process of the MBS service. For example, UE 2 in FIG. 5 moves and hands over from a first access network device to a second access network device. After the UE 2 hands over to the second access network device, the second access network device sends MBS service data to the UE 2.

The following describes in detail the transmission process of the MBS service data from a perspective of a transmission process of a data packet. With reference to FIG. 1, the core network device sends a data packet of an MBS service to the access network device by using an MBS session. It may be understood that one MBS session corresponds to one transmission channel (for example, a GTP-U tunnel or an N3 interface), and one MBS session or one transmission channel includes one or more quality of service (QoS) flows, namely, QoS flows. The QoS flow of the MBS session may also be referred to as an MBS flow or have another name. This is not limited in this embodiment of this application. One radio bearer corresponds to one packet data convergence protocol (PDCP) entity.

After the core network device obtains the data packet of the MBS service, the core network device adds a core network serial number, for example, a general packet radio service tunneling protocol-user plane serial number (GPRS tunneling protocol-U serial number, GTP-U SN), to each data packet. In addition, the core network device may add a QoS flow identifier serial number (, QFI SN) to each data packet. The core network device may set a GTP-U SN and/or a QFI SN for each data packet. In some embodiments, a GTP-U SN setting rule is as follows: GTP-U SNs are uniformly set in an MBS session, that is, in an MBS session, GTP-U SNs of data packets belonging to the MBS session sequentially increase, and settings of the GTP-U SNs are irrelevant to QoS flows included in the MBS session, that is, the GTP-U SNs do not distinguish between QoS flows. A QFI SN setting rule is as follows: QFI SNs are uniformly set in a QoS flow, and QFI SNs of data packets in different QoS flows are set independently. For example, in a QoS flow, QFI SNs of data packets belonging to the QoS flow sequentially increase, and settings of QFI SNs of data packets in different QoS flows do not affect each other.

Figure 6:
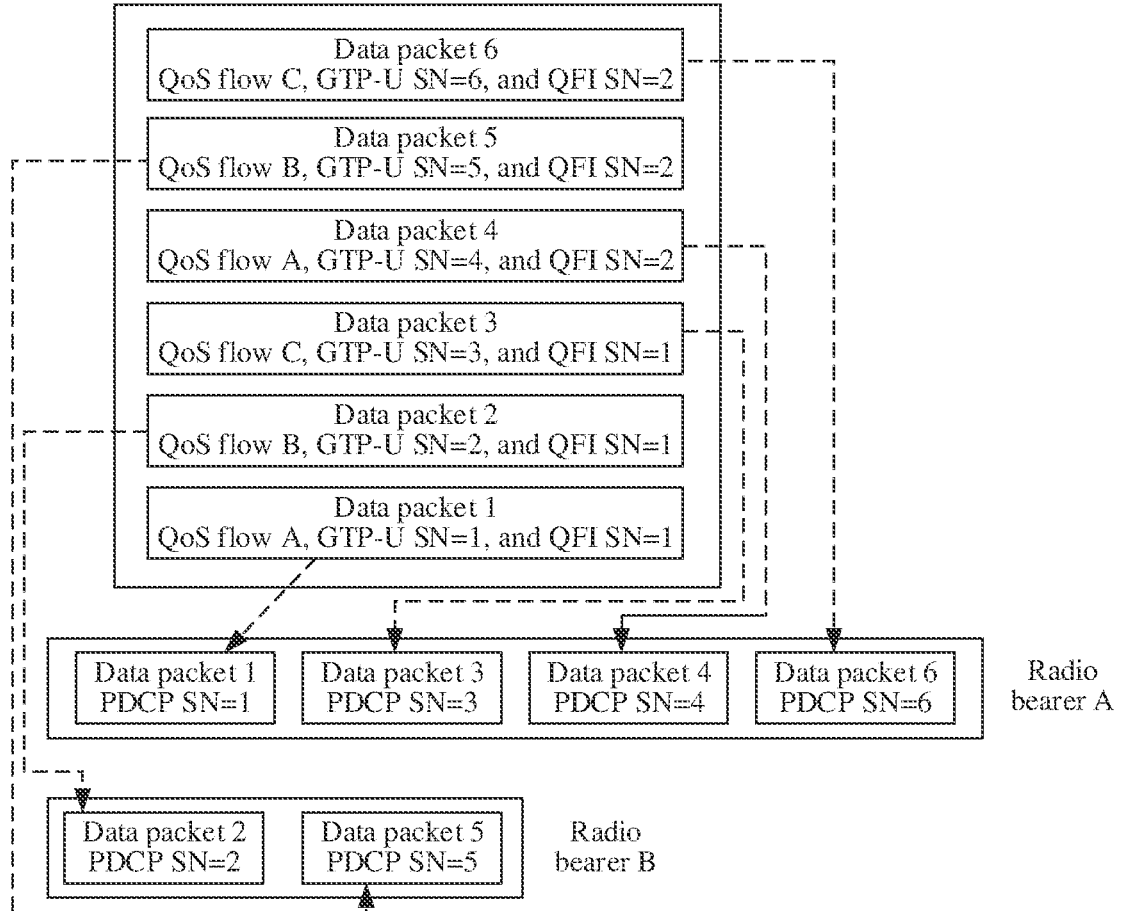
FIG. 6 is a schematic diagram of an MBS session mapping relationship according to an embodiment of this application.

For example, refer to FIG. 6. An MBS session is used as an example. The MBS session includes three QoS flows, which are respectively denoted as a QoS flow A, a QoS flow B, and a QoS flow C. Six continuous data packets in the MBS session are used as an example and are respectively denoted as a data packet 1, a data packet 2, a data packet 3, a data packet 4, a data packet 5, and a data packet 6. According to the foregoing GTP-U SN setting rule, GTP-U SNs of the six data packets may be 1, 2, 3, 4, 5, 6 sequentially. The data packet 1 and the data packet 4 belong to a QoS flow A, the data packet 2 and the data packet 5 belong to a QoS flow B, and the data packet 3 and the data packet 6 belong to a QoS flow C. According to the foregoing QFI SN setting rule, QFI SNs of the data packet 1 and the data packet 4 in the QoS flow A are 1 and 2 sequentially; QFI SNs of the data packet 2 and the data packet 5 in the QoS flow B are 1 and 2 sequentially; QFI SNs of the data packet 3 and the data packet 6 in the QoS flow C are 1 and 2 sequentially.

In conclusion, after setting the GTP-U SN and/or the QFI SN for the data packet received by the core network device, the core network device sends the data packet to the access network device. The access network device receives the data packet, and establishes mapping from a QoS flow of the MBS session to a radio bearer. In other words, the data packet of the QoS flow needs to be transmitted by using the radio bearer to which the QoS flow is mapped. It is assumed herein that a radio bearer is in a one-to-one correspondence with a PDCP, and therefore, the PDCP is used to represent the radio bearer. After removing a header including the GTP-U SN and/or the QFI SN, the access network device transmits the data packet to a PDCP entity, and the PDCP entity of the access network device sets a PDCP SN for the data packet. After the data packet is processed by each protocol layer entity based on a corresponding radio bearer, the data packet is sent to the user equipment. In some embodiments, the access network device transmits the data packet of the corresponding QoS flow by using the radio bearer based on the mapping relationship from the QoS flow of the MBS session to the radio bearer. Optionally, the mapping relationship from the QoS flow of the MBS session to the radio bearer may include but is not limited to: one-to-one mapping between the QoS flow of the MBS session and the radio bearer and many-to-one mapping between QoS flows of the MBS session and the radio bearer. The one-to-one mapping is that one QoS flow corresponds to one radio bearer, and one radio bearer corresponds to one QoS flow. Alternatively, it may be understood as that all data packets of a same QoS flow are transmitted by using only one radio bearer, and the radio bearer is used to transmit only the data packets of the QoS. The many-to-one mapping is that a plurality of QoS flows correspond to one radio bearer. That all QoS flows of the MBS session are mapped to a same radio bearer means that all the QoS flows correspond to one radio bearer. Alternatively, it may be understood as that the MBS session is one-to-one mapped to the radio bearer, and all data packets in the MBS session are transmitted by using one radio bearer.

Optionally, in this embodiment of this application, the access network device may set the PDCP SN of the data packet based on the GTP-U SN of the data packet or the QFI SN of the data packet. The MBS session shown in FIG. 6 is still used as an example. Mapping between the three QoS flows included in the MBS session and radio bearers is as follows: The QoS flow A and the QoS flow C are mapped to a radio bearer A (which may be denoted as a PDCP A that means a PDCP entity A); the QoS flow B is mapped to a radio bearer B (denoted as a PDCP B). In this case, data packets of the QoS flow A and the QoS flow C are transmitted by using the radio bearer A, and the PDCP A adds PDCP SNs to the data packets of the QoS flow A and the QoS flow C; data packets of the QoS flow B are transmitted by using the radio bearer B, and the PDCP B adds PDCP SNs to the data packets of the QoS flow B. It is assumed that the PDCP SN of the data packet is set based on the GTP-U SN, and the PDCP SN of the data packet is equal to the GTP-U SN. For details about the PDCP SN of the data packet of the MBS session, refer to FIG. 6.

It may be understood that even if each base station in a communication system sets the PDCP SN of the data packet in the foregoing manner, a data packet may be lost in a handover process. In some embodiments, in a transmission process of an MBS service, when the UE hands over from one access network device to another access network device, because different access network devices may have different transmission progresses for data packets of a same MBS service, and the different access network devices independently set a mapping relationship from a QoS flow to a radio bearer. For example, for MBS services with a same service identifier, the different access network devices may establish different mapping relationships between QoS flows of MBS sessions and radio bearers, and set different PDCP SNs for a same data packet. Consequently, in the handover process of the UE, the two access network devices cannot learn statuses of data packets actually transmitted by each other, and a data packet may be lost in the handover process of the UE.

In addition, the phenomenon of data packet loss in the handover process of the UE is not limited to the MBS service, and a unicast service may also have the problem of packet loss.

Based on the problem in the background, embodiments of this application provide a data transmission method and apparatus. A core network device may send first indication information to a first access network device. After receiving the first indication information, the first access network device determines, based on the first indication information, that a mapping relationship from a QoS flow of a current session (referred to as a first session) to a radio bearer is a first mapping relationship, so that the first access network device transmits a data packet from the first session based on the first mapping relationship. An access network device in the communication system transmits a data packet according to the data transmission method provided in embodiments of this application, so that data packets lost in a handover process of user equipment can be reduced, thereby providing a better communication service for the user equipment.

The data transmission method provided in embodiments of this application may be applied to a scenario in which one entity in a communication system sends information to another entity and the another entity receives information. In addition, the method may be applied to a scenario in which an access network device communicates with one user equipment, that is, a unicast service scenario. Alternatively, the method may be applied to a scenario in which an access network device communicates with a plurality of user equipments, that is, a multicast broadcast (MBS) service scenario. Optionally, the method may be applied to a 5G NR system, or may be applied to another communication system.

Figure 7:
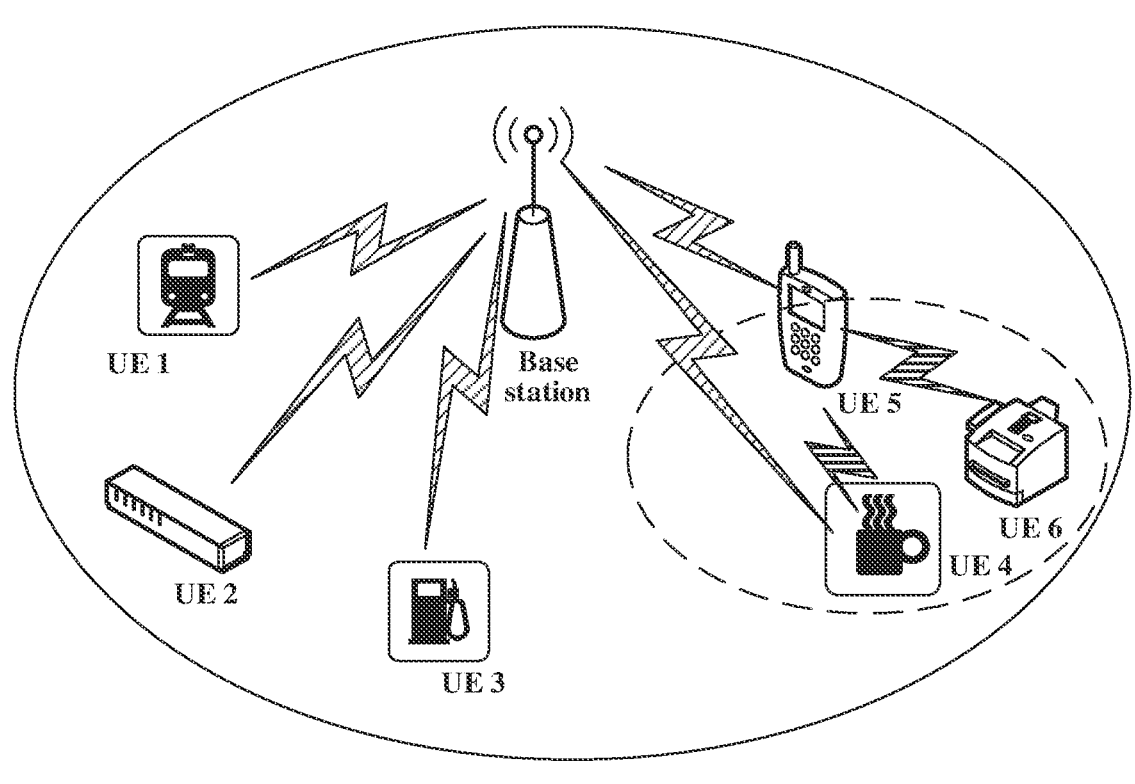
FIG. 7 is a schematic diagram of an application scenario of a data transmission method according to an embodiment of this application.

For example, the 5G NR system is used as an example. The access network device may be a base station, and the user equipment may be UE. FIG. 7 shows an application scenario according to an embodiment of this application. In FIG. 7, a communication system includes a base station and six UEs, which are respectively denoted as a UE 1 to a UE 6. In the communication system, the base station may separately send downlink data to the UE 1 to the UE 6, and the UE 1 to the UE 6 may send uplink data to the base station. Optionally, the UE 4, the UE 5, and the UE 6 in the communication system may form a communication system. The base station sends downlink data to the UE 1, the UE 2, the UE 3, and the UE 5, then the UE 5 sends downlink information to the UE 4 and the UE 6, and the UE 4 and the UE 6 may send uplink information to the base station by using the UE 5.

Figure 8:
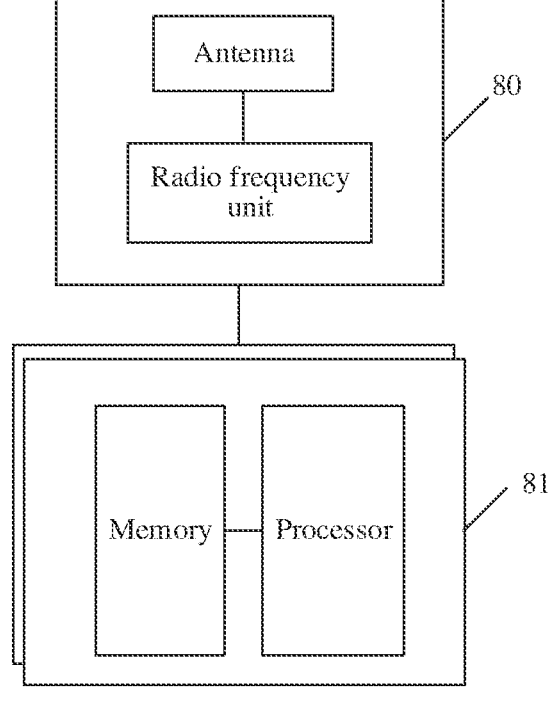
FIG. 8 is a schematic diagram of hardware of a base station according to an embodiment of this application.

Optionally, the access network devices in embodiments of this application, for example, the first access network device and the second access network device, may be base stations. The base station may be a device such as a commonly used base station, an evolved node base station (eNB), a next-generation node base station (gNB) in a 5G system, a new radio eNB (eNB), a macro base station, a micro base station, a high frequency base station, or a transmission reception point (TRP). For example, in embodiments of this application, the commonly used base station is used as an example to describe a hardware structure of a network device. The following describes components of the base station provided in embodiments of this application with reference to FIG. 8. As shown in FIG. 8, the base station provided in embodiments of this application may include a part 80 and a part 81. The part 80 is mainly configured to: receive and transmit a radio frequency signal, and perform conversion between a radio frequency signal and a baseband signal. The part 81 is mainly configured to: perform baseband processing, control the base station, and the like. The part 80 may be usually referred to as a transceiver unit, a transceiver, a transceiver circuit, or the like. The part 81 is usually a control center of the base station, and may be usually referred to as a processing unit.

The transceiver unit in the part 80 may also be referred to as a transceiver or the like. The transceiver unit includes an antenna and a radio frequency unit, or includes only a radio frequency unit or a part of a radio frequency unit. The radio frequency unit is mainly configured to perform radio frequency processing. Optionally, in the part 80, a component configured to implement a receiving function may be considered as a receiving unit, and a component configured to implement a sending function may be considered as a sending unit. In other words, the part 80 includes the receiving unit and the sending unit. The receiving unit may also be referred to as a receiver, a receiver circuit, or the like, and the sending unit may be referred to as a transmitter, a transmitter circuit, or the like.

The 81 part may include one or more boards or chips. Each board or chip may include one or more processors and one or more memories. The processor is configured to read and execute a program in the memory, to implement a baseband processing function and control the base station. If a plurality of boards exist, the boards may be interconnected to increase a processing capability. In an optional implementation, alternatively, the plurality of boards may share one or more processors, or the plurality of boards share one or more memories. The processor and the memory may be integrated together, or may be disposed separately. In some embodiments, the part 80 and the part 81 may be integrated together, or may be disposed separately. In addition, all functions of the part 81 may be integrated in a chip for implementation; or some functions may be integrated in a chip for implementation, and the other functions may be integrated in other one or more chips for implementations. This is not limited in embodiments of this application.

The core network device in embodiments of this application may be a related network function (NF) in a 5G NR system, for example, an access and mobility management function (AMF), a session management function (SMF), and a user plane function (UPF). The UPF is mainly responsible for related processing of a user plane data packet, and may be configured to: obtain a data packet from a data network (a data server), set a core network serial number for the data packet, and then send the data packet to the access network device. The AMF is mainly responsible for related processing of data plane signaling. For example, the AMF may be configured to generate indication information, and send the indication information (for example, first indication information and second indication information in the following embodiments) to the access network device. The SMF is mainly responsible for sending some data packet processing policies to the UPF.

Certainly, the core network device may alternatively be a network element or a network function that has the foregoing functions in another communication system such as 4G. This is determined based on an actual situation, and is not limited in embodiments of this application.

Figure 9:
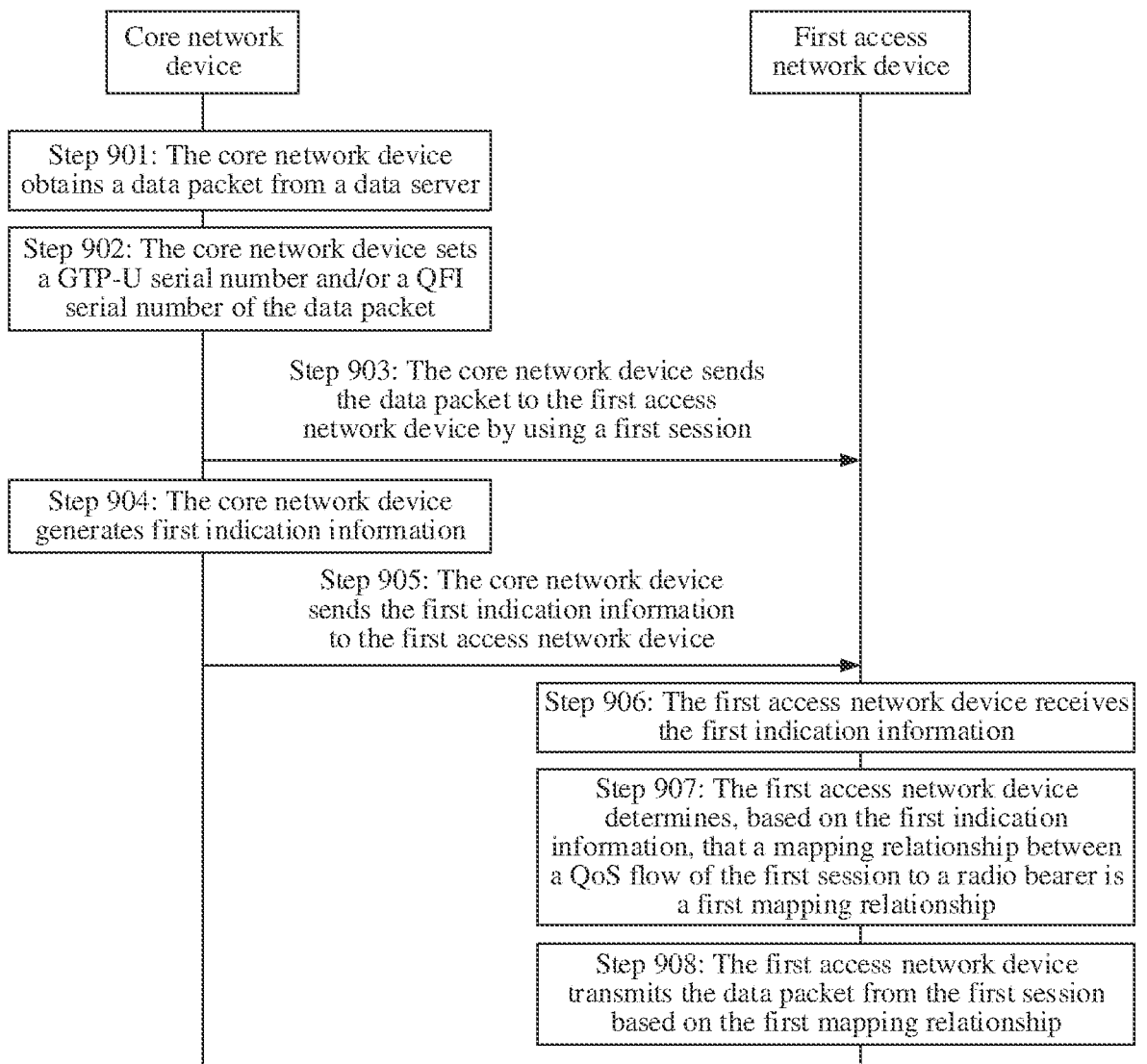
FIG. 9 is a schematic diagram 1 of a data transmission method according to an embodiment of this application.

It can be learned with reference to the foregoing application scenario that the data transmission method provided in embodiments of this application may be used to transmit an MBS service, or may be used to transmit a unicast service. This is not limited in embodiments of this application. In embodiments of this application, the data transmission method provided in embodiments of this application is described in detail by using the MBS service as an example. As shown in FIG. 9, the data transmission method provided in embodiments of this application includes step 901 to step 908.

Step 901: A core network device obtains a data packet from a data server.

In this embodiment of this application, the data packet obtained by the core network device from the data server or a content server is a data packet of a service. The core network device may directly or indirectly obtain the data packet from the data server or the content server. For example, the data packet is sent from the data server or the content server to the core network device by using a gateway or another forwarding device. After the core network device obtains the data packet of the service, the core network device sends the data packet to an access network device through a transmission channel or a communication interface between the core network device and the access network device. It may be understood that one transmission channel or one communication interface corresponds to one session, and the session is referred to as a first session in the following embodiment. The first session is a session that is established between the core network device and a first access network device and that is used for transmitting data of a service. The first session may include one or more QoS flows.

For an MBS service, the first session is an MBS session, and a QoS flow included in the MBS session may be referred to as an MBS flow (that is, an MBS flow).

Step 902: The core network device sets a GTP-U serial number and/or a QFI serial number of the data packet.

With reference to the GTP-U serial number (that is, the GTP-U SN) setting method and the QFI serial number (that is, the QFI SN) setting method described in the foregoing embodiments, the core network device uniformly sets GTP-U serial numbers of data packets transmitted by using the first session, and the GTP-U SNs of the data packets belonging to the first session sequentially increase. For the data packets transmitted by using the first session, the core network device uniformly sets the QFI serial numbers of the data packets in each QoS flow based on the QoS flow to which the data packets belong. QFI SNs of data packets in different QoS flows are separately set. In one QoS flow, QFI SNs of data packets belonging to the QoS flow sequentially increase. Optionally, in addition to the two SNs, a new SN, for example, an MBS SN, may be designed for the MBS service. This is not limited in this embodiment of this application.

In this embodiment of this application, the core network device determines, based on a quality of service (QoS) requirement of a service to which an obtained data packet belongs, whether lossless transmission or highly reliable transmission of the service needs to be ensured in a moving process of the UE. If the lossless transmission or the highly reliable transmission of the service needs to be ensured in the moving process of the UE, when the core network device sends same data packets to different access network devices, the core network device sets a same GTP-U serial number for the same data packets, and/or sets a same QFI serial number for the same data packets. That is, for a same service (for example, services with a same TMGI), when the core network device sends same data packets to different access network devices, GTP-U serial numbers of the same data packets are the same, and/or QFI serial numbers of the same data packets are the same.

For example, a GTP-U serial number of a first data packet sent by the core network device to the first access network device by using the first session is the same as a GTP-U serial number of the first data packet sent by the core network device to a second access network device by using a second session, and/or a QFI serial number of a first data packet sent by the core network device to the first access network device by using a QoS flow of the first session is the same as a QFI serial number of the first data packet sent by the core network device to a second access network device by using a QoS flow of a second session.

It should be noted that, in this embodiment of this application, same data packets are a plurality of data packets with same content and a same size and obtained by copying one data packet by the core network device. The plurality of data packets may be referred to as same data packets.

Step 903: The core network device sends the data packet to the first access network device by using the first session.

Step 904: The core network device generates first indication information.

The first indication information indicates a mapping relationship from a QoS flow of the first session to a radio bearer.

Step 905: The core network device sends the first indication information to the first access network device.

Optionally, the core network device may send the first indication information to the first access network device by using a first session establishment/modification request message or a QoS flow establishment/modification request message, or may send the first indication information to the first access network device by using another message. This is not limited in this embodiment of this application.

Step 906: The first access network device receives the first indication information.

Step 907: The first access network device determines, based on the first indication information, that the mapping relationship from the QoS flow of the first session to the radio bearer is a first mapping relationship.

The first mapping relationship is one-to-one mapping between the QoS flow of the first session and the radio bearer, or mapping between all QoS flows of the first session and a same radio bearer. For example, the first session includes three QoS flows, which are denoted as a QoS flow A, a QoS flow B, and a QoS flow C. Table 1 shows an example of the one-to-one mapping between the QoS flow of the first session and the radio bearer. Table 2 shows an example of the mapping between the QoS flow of the first session and the same radio bearer.

TABLE 1

| QoS flow | Radio bearer |
| --- | --- |
| QoS flow A | Radio bearer A |
| QoS flow B | Radio bearer B |
| QoS flow C | Radio bearer C |

TABLE 2

| QoS flow | Radio bearer |
| --- | --- |
| QoS flow A | Radio bearer A |
| QoS flow B | Radio bearer A |
| QoS flow C | Radio bearer A |

In an implementation, that the first access network device determines, based on the first indication information, that the mapping relationship from the QoS flow of the first session to the radio bearer is a first mapping relationship includes: The first indication information indicates the first mapping relationship. In this way, when the first access network device receives the first indication information, the first access network device determines the first mapping relationship based on an indication of the first indication information.

Optionally, the first indication information is explicit indication information, and the first indication information may include the first mapping relationship. Alternatively, the first indication information may be an index, and the index indicates the first mapping relationship. The first access network device determines the first mapping relationship based on the index. A correspondence between the index and the first mapping relationship may be preconfigured by the core network device or predefined in a protocol.

In another implementation, that the first access network device determines, based on the first indication information, that the mapping relationship from the QoS flow of the first session to the radio bearer is a first mapping relationship includes: The first access network device determines, based on the first indication information, whether the data packet from the first session or a service to which the data packet belongs satisfies a preset condition; and if the data packet or the service to which the data packet belongs satisfies the preset condition, the first access network device determines, based on the first indication information, that the mapping relationship from the QoS flow of the first session to the radio bearer is the first mapping relationship.

It may be understood that, if the first access network device determines, based on the first indication information, that the data packet from the first session satisfies the preset condition, it indicates that lossless transmission or highly reliable transmission needs to be ensured for a service to which the data packet of the first session belongs when the access network device performs handover. In other words, for the service, different access network devices need to set a same PDCP serial number for same data packets of the service. In addition, for the service, the access network device needs to establish the mapping from the QoS flow to the radio bearer based on the first mapping relationship.

Optionally, when the first access network device determines, based on the first indication information, that the data packet from the first session satisfies the preset condition, the first access network device may determine, based on the first indication information, that the mapping relationship from the QoS flow of the first session to the radio bearer is the first mapping relationship in two manners. In one manner, the first indication information includes the first mapping relationship, and the first access network device may obtain the first mapping relationship from the first indication information. In the other manner, the first mapping relationship is predefined in a protocol or preconfigured by the core network device for the access network device. When the first access network device determines, based on the first indication information, that the data packet from the first session satisfies the preset condition, the first access network device determines the first mapping relationship based on the pre-definition in the protocol or the preconfiguration.

Optionally, the first indication information includes the QoS identifier or the value of the QoS parameter, and the QoS identifier or the value of the QoS parameter may be carried in a first session establishment request message. The QoS identifier may include a 5G quality of service identifier (5QI). The QoS parameter includes at least one of the following: a priority, a packet delay budget, or a packet bit error rate. Optionally, the value of the QoS parameter may be a value of the foregoing existing QoS parameter, or the value of the QoS parameter may be a value of a newly defined QoS parameter in this embodiment of this application. The value may be selected based on an actual requirement. This is not limited herein.

For content of the first indication information, the preset condition may be that the QoS identifier satisfies a condition or the value of the QoS parameter satisfies a condition. Optionally, the preset condition may be configured for a base station by using the core network device or predefined in a protocol.

For example, the QoS identifier is the 5QI. The preset condition may be that the 5QI of the data packet is equal to a preset value. For example, the preset condition is that the 5QI of the data packet is equal to 73. After the first access network device receives the first indication information, the first access network device obtains the 5QI of the data packet from the first indication information, then the first access network device determines whether the 5QI carried in the first indication information is equal to 73, and the first access network device determines the first mapping relationship based on the first indication information when the 5QI in the first indication information is equal to 73.

For example, the QoS parameter is the priority. The preset condition may be that the priority is greater than or equal to a preset priority. After the first access network device receives the first indication information, the first access network device obtains the priority from the first indication information, then the first access network device determines whether the priority carried in the first indication information is greater than or equal to the preset priority, and the first access network device determines the first mapping relationship based on the first indication information when the priority in the first indication information is greater than or equal to the preset priority.

For example, the QoS parameter is the packet bit error rate. The preset condition may alternatively be that the packet bit error rate of the data packet is less than a preset threshold. After the first access network device receives the first indication information, the first access network device obtains the packet bit error rate from the first indication information, then the first access network device determines whether the packet bit error rate carried in the first indication information is less than the preset threshold, and the first access network device determines the first mapping relationship based on the first indication information when the packet bit error rate in the first indication information is less than the preset threshold.

It should be noted that, a value relationship in the preset condition herein is merely an example, and is not strictly limited. For example, a case in which the preset condition is that a QoS parameter is greater than, less than, equal to, greater than or equal to, or less than or equal to a value falls within the protection scope of this embodiment.

Step 908: The first access network device transmits the data packet from the first session based on the first mapping relationship.

In this embodiment of this application, the first access network device determines that the mapping relationship between the QoS flow of the first session and the radio bearer is the first mapping relationship, the first access network device establishes the mapping between the QoS flow of the first session and the radio bearer, and then the first access network device transmits the data packet from the first session based on the first mapping relationship.

In an implementation, before the core network device sends the first indication information to the first access network device, the data transmission method provided in embodiments of this application may further include: The core network device receives fourth indication information from the second access network device, where the fourth indication information indicates the mapping relationship from the QoS flow of the first session to the radio bearer.

Correspondingly, a method for generating the first indication information by the core network device includes: The core network device generates the first indication information based on the fourth indication information. In this way, the core network device sends the first indication information to the first access network device, so that the mapping relationship that is from the QoS flow to the radio bearer and that corresponds to the first access network device is the same as the mapping relationship that is from the QoS flow to the radio bearer and that corresponds to the second access network device.

Figure 10:
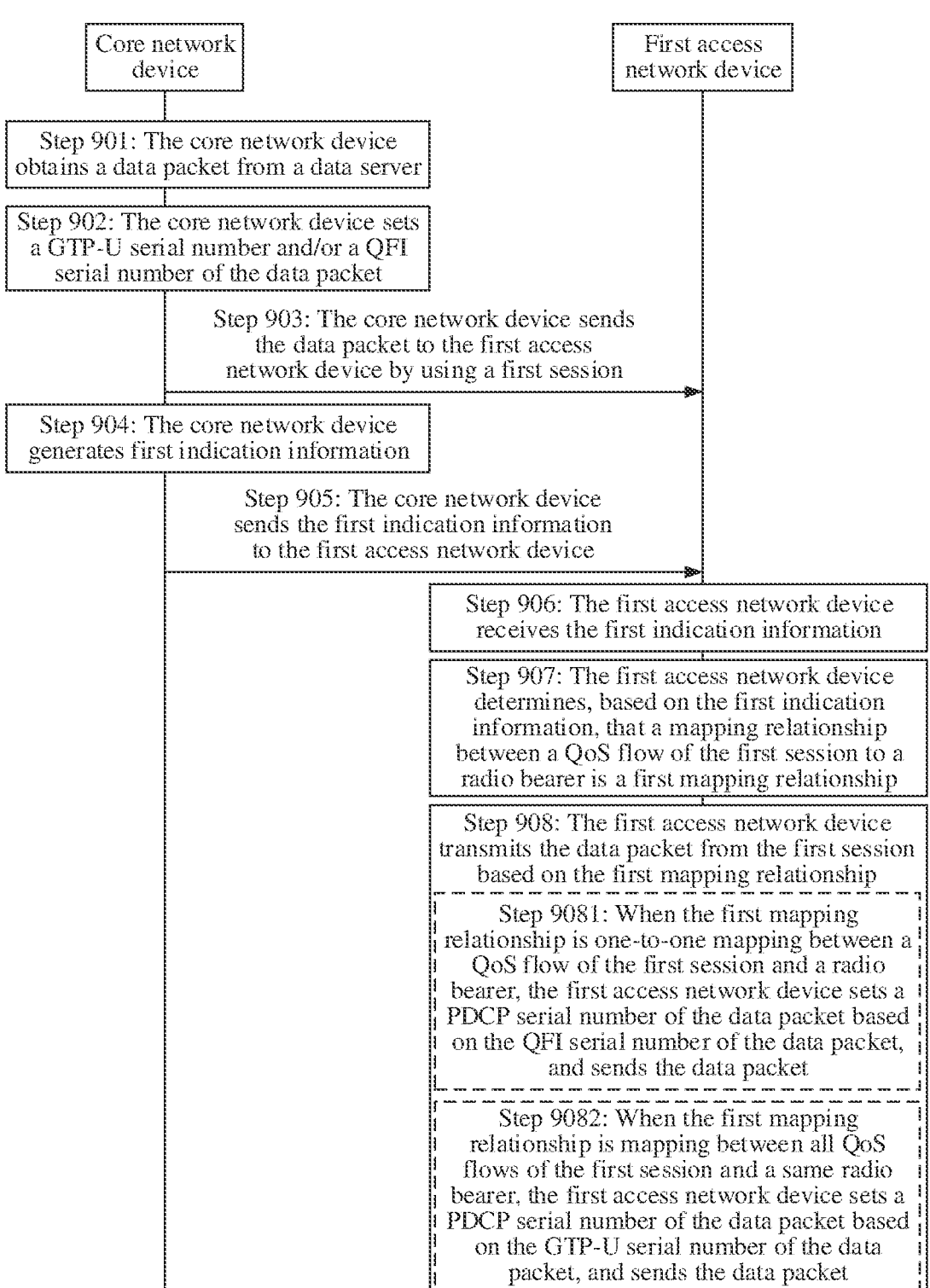
FIG. 10 is a schematic diagram 2 of a data transmission method according to an embodiment of this application.

Optionally, with reference to FIG. 9, as shown in FIG. 10, step 908 includes step 9081 or step 9082.

Step 9081: When the first mapping relationship is one-to-one mapping between the QoS flow of the first session and the radio bearer, the first access network device sets a PDCP serial number of the data packet based on the QFI serial number of the data packet, and sends the data packet.

In an implementation, the PDCP serial number of the data packet from the first session is equal to the QFI serial number of the data packet, or a difference between the PDCP serial number of the data packet and the QFI serial number of the data packet is a fixed value. The fixed value may be predefined in a protocol, preconfigured by the core network device, or indicated by using the first indication information.

In another implementation, if a maximum length of the PDCP serial number of the data packet is less than a maximum length of the QFI serial number of the data packet, the PDCP serial number of the data packet satisfies $A=(B)mod(X)$. A represents the PDCP serial number of the data packet, B represents the QFI serial number of the data packet, X represents a maximum value of the PDCP serial number, and mod represents a modulo operation. In this way, it can be ensured that the PDCP serial number set based on the QFI serial number does not exceed the maximum value of the PDCP serial number.

Figure 11:
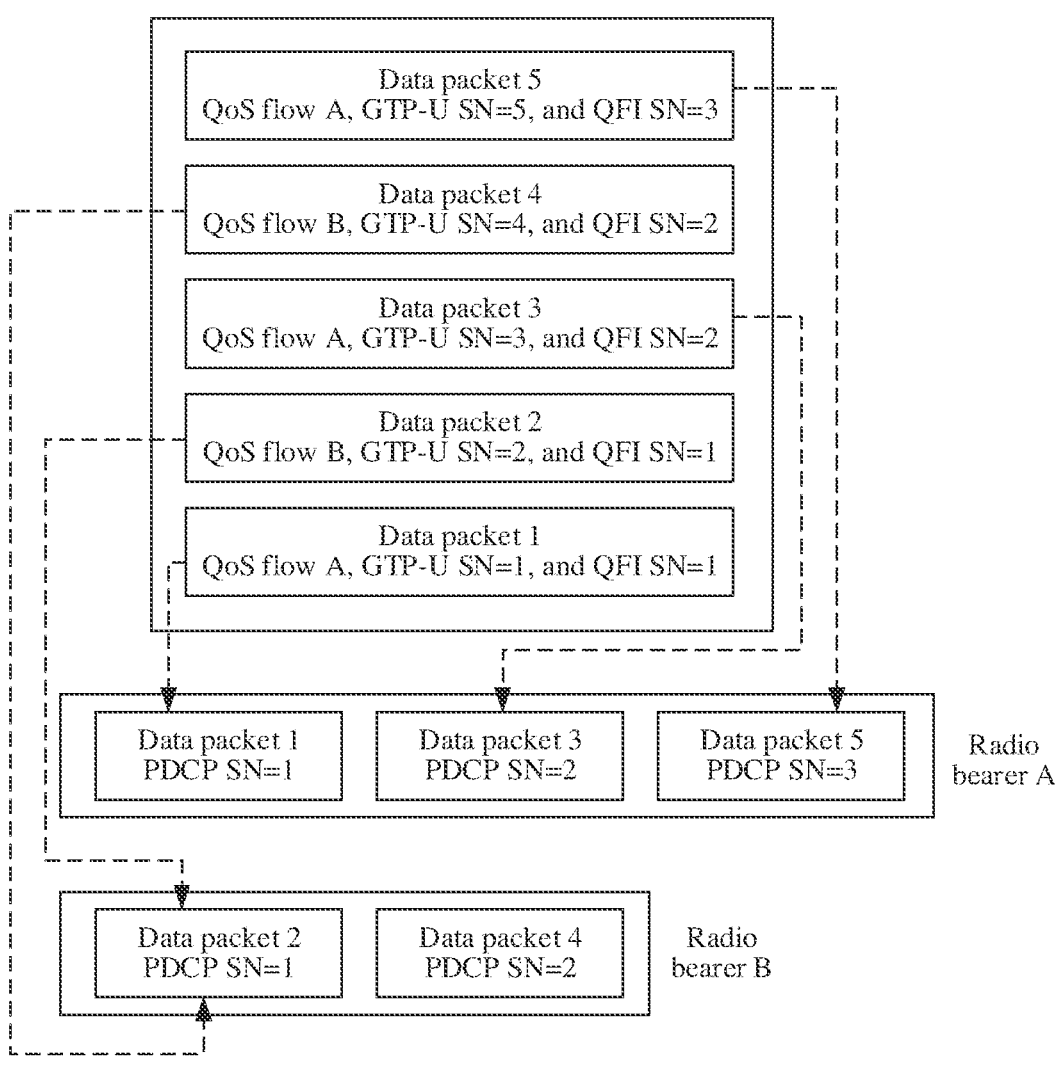
FIG. 11 is a schematic setting diagram 1 of a PDCP serial number of a data packet according to an embodiment of this application.

For example, FIG. 11 is a schematic setting diagram of the PDCP serial number of the data packet from the first session shown when the QoS flow of the first session is one-to-one mapped to the radio bearer. In FIG. 11, the QoS flow of the first session includes a QoS flow A and a QoS flow B. Five continuous data packets from the first session are used as an example. A data packet 1, a data packet 3, and a data packet 5 belong to the QoS flow A, and a data packet 2 and a data packet 4 belong to the QoS flow B. In this case, PDCP serial numbers of the data packets are set based on that the PDCP serial numbers of the data packets are equal to QFI serial numbers of the data packets. It can be learned that PDCP serial numbers of data packets in a same QoS flow are continuous and sequentially increase.

In this embodiment of this application, the QoS flow of the first session is one-to-one mapped to the radio bearer, and the first access network device sets the PDCP serial number of the data packet based on the QFI serial number of the data packet, and sends the data packet to user equipment. It should be understood that both the source access network device and the target access network device of the user equipment set the PDCP serial number of the data packet according to the method. With reference to the handover procedure shown in FIG. 4, when the user equipment hands over from the first access network device to the second access network device, because the first access network device and the second access network device set a same PDCP serial number for same data packets in a same QoS flow, and also set a same mapping relationship from the QoS flow to a radio bearer, when the UE hands over between different access network devices, a progress of transmitting the data packet by the access network device may be determined based on the PDCP serial number, and data packets lost in the handover process of the user equipment may be reduced by using a data forwarding technology or a data buffering technology.

It may be understood that, the data forwarding technology means that in the handover process of the UE, the first access network device sends the data packet from the first session to the second access network device, so that after the user equipment successfully performs handover, the second access network device sends, to the user equipment, the data packet received by the second access network device from the first access network device, to reduce data packets lost in the handover process of the user equipment. The data buffering technology means that in the handover process of the user equipment, the second access network device buffers the data packet received by the second access network device from the first session, so that after the user equipment successfully performs handover, the second access network device sends the buffered data packet to the user equipment, to reduce data packets lost in the handover process of the user equipment.

Step 9082: When the first mapping relationship is mapping between all QoS flows of the first session and a same radio bearer, the first access network device sets a PDCP serial number of the data packet based on the GTP-U serial number of the data packet, and sends the data packet.

In an implementation, the PDCP serial number of the data packet from the first session is equal to the GTP-U serial number of the data packet, or a difference between the PDCP serial number of the data packet and the GTP-U serial number of the data packet is a fixed value. Similarly, the fixed value may be predefined in a protocol, preconfigured by the core network device, or indicated by using the first indication information.

In another implementation, if a maximum length of the PDCP serial number of the data packet is less than a maximum length of the GTP-U serial number of the data packet, the PDCP serial number of the data packet satisfies $A=(C)\bmod(X)$. A represents the PDCP serial number of the data packet, C represents the GTP-U serial number of the data packet, X represents a maximum value of the PDCP serial number, and mod represents a modulo operation. In this way, it can be ensured that the PDCP serial number set based on the GTP-U serial number does not exceed the maximum value of the PDCP serial number.

Figure 12:
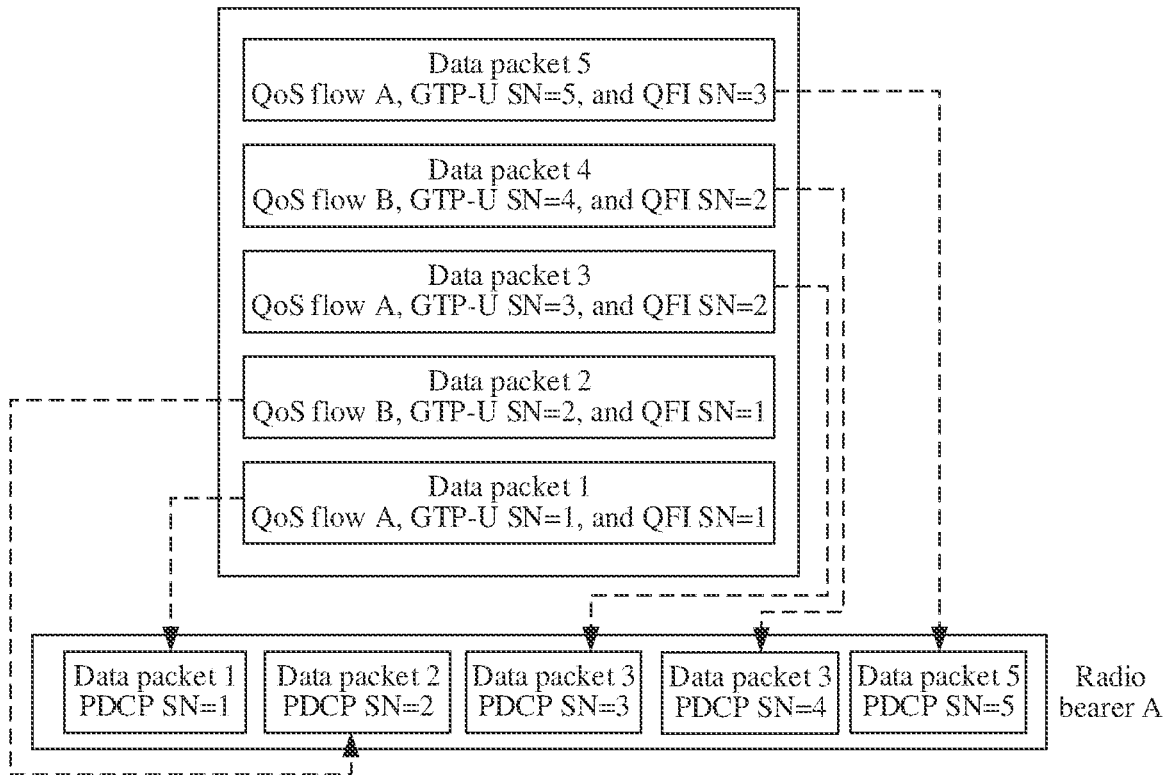
FIG. 12 is a schematic setting diagram 2 of a PDCP serial number of a data packet according to an embodiment of this application.

For example, FIG. 12 is a schematic setting diagram of the PDCP serial number of the data packet from the first session shown when all QoS flows of the first session are mapped to a same radio bearer. In FIG. 12, the QoS flow of the first session includes a QoS flow A and a QoS flow B. Five continuous data packets from the first session are used as an example. A data packet 1, a data packet 3, and a data packet 5 belong to the QoS flow A, and a data packet 2 and a data packet 4 belong to the QoS flow B. In this case, PDCP serial numbers of the data packets are set based on that the PDCP serial numbers of the data packets are equal to GTP-U serial numbers of the data packets. It can be learned that PDCP serial numbers of data packets in the first session are continuous and sequentially increase.

In this embodiment of this application, all the QoS flows of the first session are mapped to the same radio bearer, and the first access network device sets the PDCP serial number of the data packet based on the GTP-U serial number of the data packet, and sends the data packet to the user equipment. It should be understood that both the source access network device and the target access network device of the user equipment set the PDCP serial number of the data packet according to the method. Similarly, with reference to the handover procedure shown in FIG. 4, when the user equipment hands over from the first access network device to the second access network device, because the first access network device and the second access network device set a same PDCP serial number for same data packets in a same session, and also set a same mapping relationship from the QoS flow to a radio bearer, when the UE hands over between different access network devices, a progress of transmitting the data packet by the access network device may be determined based on the PDCP serial number, and data packets lost in the handover process of the user equipment may be reduced by using a data forwarding technology or a data buffering technology.

In conclusion, according to the data transmission method provided in embodiments of this application, data packets lost in the handover process of the user equipment can be reduced.

Figure 13:
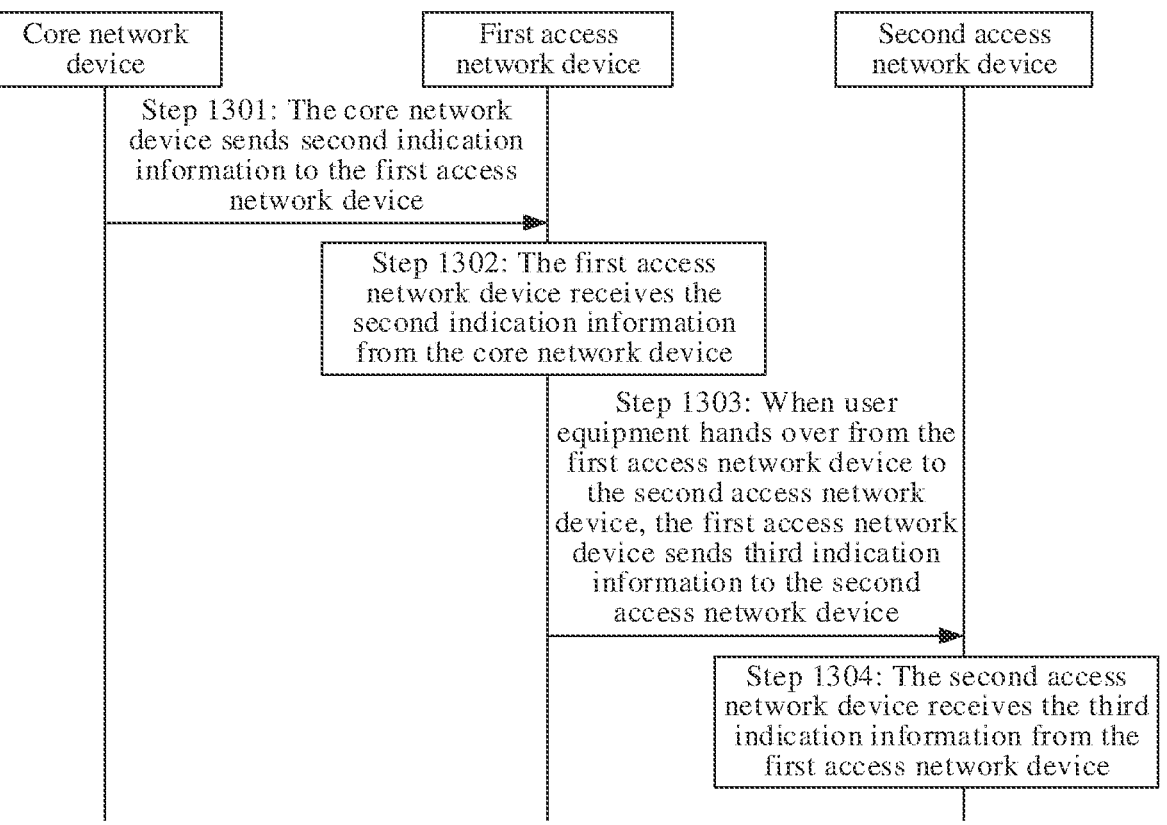
FIG. 13 is a schematic diagram 3 of a data transmission method according to an embodiment of this application.

Optionally, as shown in FIG. 13, after the core network device obtains the data packet from the data server, the data transmission method provided in embodiments of this application may further include step 1301 to step 1304.

Step 1301: The core network device sends second indication information to the first access network device.

The second indication information indicates whether the service to which the data packet from the first session belongs is a local service.

In this embodiment of this application, after the core network device obtains the data packet from the data server, the core network device may determine whether the service to which the data packet belongs is the local service or a non-local service, and then the core network device indicates, to the first access network device by using the indication information, a type of the service to which the data packet belongs.

Optionally, the second indication information may include a service identifier, for example, a service identifier of an MBS service. In addition, optionally, the second indication information may include local service indication information. The local service indication information may indicate whether the service is the local service. The second indication information may alternatively be other indication information. This is not limited in this embodiment of this application. In addition, optionally, the second indication information may also include local area information of the local service, for example, may include a cell identifier (list), a tracking area identifier (tracking area, TA) (list), or a base station identifier (list) included in at least one local area corresponding to the local service.

In this embodiment of this application, when the first access network device determines that the service to which the data packet of the first session belongs is the local service, the second indication information further indicates a local area (that is, area information of the first access network device) to which the first access network device belongs. The second indication information may indicate areas in which service content of the service is the same. For example, for an MBS service, the second indication information may be a cell identifier list (cell list) of the MBS service, to indicate cells in which service content is the same. Alternatively, the second indication information is a TA list, to indicate TAs in which service content is the same.

Optionally, indication information that is sent to the first access network device and that indicates whether the service to which the data packet from the first session belongs is the local service may be different from indication information that indicates the local area to which the first access network device belongs. In other words, two pieces of independent indication information respectively indicate whether the service to which the data packet from the first session belongs is the local service, and indicate the local area to which the first access network device belongs. This is not limited in this embodiment of this application.

For example, the indication information indicating the local area to which the first access network device belongs may be carried in context information of the service.

In this embodiment of this application, the service to which the data packet obtained by the core network device belongs is the local service, and the core network device determines whether different access network devices belong to a same local area of a same service (for example, services with a same TMGI). For example, a first service is the local service. For the first access network device, if the first access network device belongs to a local area 1, and for the second access network device, if the second access network device belongs to a local area 2, it is determined that the first access network device and the second access network device do not belong to a same local area; or if the first access network device belongs to a local area 1, and the second access network device belongs to the local area 1, it is determined that the first access network device and the second access network device belong to a same local area.

If the service to which the data packet obtained by the core network device belongs is the local service, and different access network devices belong to a same local area of a same service, when sending same data packets to the different access network devices, the core network device sets GTP-U serial numbers and/or QFI serial numbers of the same data packets to be the same according to the GTP-U serial number setting method and/or the QFI serial number setting method in the foregoing embodiment.

For example, the service to which the data packet obtained by the core network device belongs is the local service, and the first access network device and the second access network device belong to a same local area of a same service. When the core network device sends same data packets to the first access network device and the second access network device, GTP-U serial numbers of the same data packets are the same, and/or QFI serial numbers of the same data packets are the same.

If the service to which the data packet obtained by the core network device belongs is the local service, and different access network devices do not belong to a same local area of a same service, when the core network device sends same data packets to the different access network devices, there is no need to limit GTP-U serial numbers of the same data packets to be the same, and/or limit QFI serial numbers of the same data packets to be the same. The GTP-U serial numbers of the same data packets may be the same or different, and/or the QFI serial numbers of the same data packets may be the same or different. This may be implemented by the core network device, and the core network device independently processes sessions connected to different access network devices.

Step 1302: The first access network device receives the second indication information from the core network device.

In this embodiment of this application, when user equipment hands over from the first access network device to the second access network device, the first access network device determines, based on the second indication information, whether the second access network device belongs to a same local area. For example, the first access network device determines, based on the cell list indicated by the core network device, whether the second access network device belongs to an area indicated by the list. If the second access network device does not belong to the area indicated by the list, it is determined that the first access network device and the second access network device do not belong to the same local area of the same service. If the second access network device belongs to the area indicated by the list, it is determined that the first access network device and the second access network device belong to the same local area of the same service.

Step 1303: When the user equipment hands over from the first access network device to the second access network device, the first access network device sends third indication information to the second access network device.

The third indication information indicates that the service to which the data packet from the first session belongs is the local service.

Optionally, the third indication information further indicates the local area to which the first access network device belongs.

Similarly, indication information that is sent to the second access network device and that indicates whether the service to which the data packet from the first session belongs is the local service may be different from indication information that indicates the local area to which the first access network device belongs. In other words, two pieces of independent indication information respectively indicate whether the service to which the data packet from the first session belongs is the local service, and indicate the local area to which the first access network device belongs. This is not limited in this embodiment of this application.

Step 1304: The second access network device receives the third indication information from the first access network device.

In this embodiment of this application, the second access network device determines, based on the third indication information, that the service to which the data packet from the first session belongs is the local service, and the local area to which the first access network device belongs and a local area to which the second access network device belongs are different local areas (that is, the first access network device and the second access network device do not belong to a same local area of a same service). The second access network device may determine that the service is a service that crosses the local area. Therefore, service continuity does not need to be ensured in the handover process of the user equipment, that is, no packet loss does not need to be ensured. In this case, the foregoing data forwarding procedure does not need to be performed, the second access network device does not need to allocate, to the first access network device, forwarding tunnel information used for data forwarding, the second access network device does not need to configure a PDCP status report in a handover request acknowledgment message, and after receiving a handover command, the user equipment does not need to send the PDCP status report to the second access network device. When the local area to which the first access network device belongs and a local area to which the second access network device belongs are different local areas, implementation complexity of the access network device and the user equipment can be reduced by performing step 1301 to step 1304.

In conclusion, on one hand, according to the data transmission method provided in embodiments of this application, regardless of whether the service is the local service or the non-local service, data may be transmitted by using the process described in step 901 to step 908, so that different access network devices set a same PDCP serial number for same data packets, so that the service continuity in the handover process of the UE can be ensured.

On the other hand, the core network device may indicate, by using the indication information (the second indication information), whether the service to which the data packet belongs is the local service or the non-local service, and indicate the local area of the access network device. For the non-local service and the local service in a same local area, the core network device and the access network device transmit data according to the data transmission method described in step 901 to step 908, so that different access network devices set a same PDCP serial number for same data packets, to ensure the service continuity in the handover process of the user equipment. For the local service in different areas, the first access network device may further send the third indication information to the second access network device, so that the second access network device determines that the first access network device and the second access network device do not belong to a same local area of a same service. In this case, the service continuity in the handover process of the user equipment does not need to be ensured, and data forwarding does not need to be performed, thereby reducing implementation complexity of the access network device and the user equipment.

Correspondingly, an embodiment of this application provides a first access network device. The first access network device is configured to perform the steps in the foregoing data transmission method. In this embodiment of this application, the first access network device may be divided into functional modules according to the foregoing method examples. For example, each functional module may be obtained through division based on each corresponding function, or two or more functions may be integrated into one processing module. The integrated module may be implemented in a form of hardware, or may be implemented in a form of a software functional module. In this embodiment of this application, module division is an example, and is merely logical function division. In actual implementation, another division manner may be used.

Figure 14:
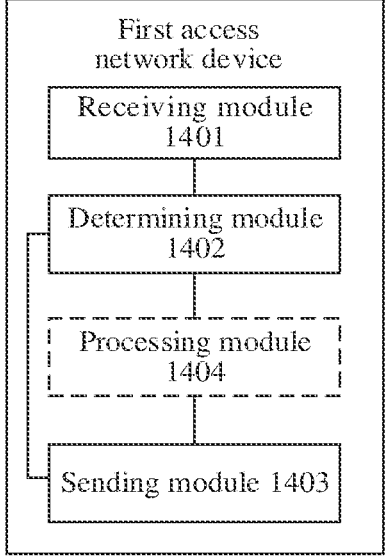
FIG. 14 is a schematic structural diagram 1 of a first access network device according to an embodiment of this application.

When functional modules corresponding to functions are obtained through division, FIG. 14 is a possible schematic structural diagram of the first access network device in the foregoing embodiments. As shown in FIG. 14, the first access network device includes a receiving module 1401, a determining module 1402, and a sending module 1403.

The receiving module 1401 is configured to receive first indication information, for example, perform step 906 in the foregoing method embodiment.

The determining module 1402 is configured to determine, based on the first indication information, that a mapping relationship from a QoS flow of a first session to a radio bearer is a first mapping relationship, for example, perform step 907 in the foregoing method embodiment.

The sending module 1403 is configured to transmit the data packet from the first session based on the first mapping relationship, for example, perform step 908 in the foregoing method embodiment.

Optionally, the first access network device provided in this embodiment of this application further includes a processing module 1404. The processing module 1404 is configured to: when the first mapping relationship is one-to-one mapping between the QoS flow of the first session and the radio bearer, set a PDCP serial number of the data packet based on a QFI serial number of the data packet from the first session, for example, perform step 9081 in the foregoing method embodiment.

Optionally, the processing module 1404 is further configured to: when the first mapping relationship is mapping between all QoS flows of the first session and a same radio bearer, set a PDCP serial number of the data packet based on a GTP-U serial number of the data packet from the first session, for example, perform step 9082 in the foregoing method embodiment.

Optionally, the receiving module 1401 is further configured to receive second indication information from a core network device, for example, perform step 1302 in the foregoing method embodiment, where the second indication information indicates that a service to which the data packet from the first session belongs is a local service, and the second indication information further indicates a local area to which the first access network device belongs.

Optionally, the sending module 1403 is further configured to: when user equipment hands over from the first access network device to a second access network device, send third indication information to the second access network device, for example, perform step 1303 in the foregoing method embodiment, where the third indication information indicates that the service to which the data packet from the first session belongs is the local service, and the third indication information further indicates the local area to which the first access network device belongs.

The modules of the first access network device may be further configured to perform other actions in the foregoing method embodiments. All related content of the steps in the foregoing method embodiments may be referenced to function descriptions of corresponding functional modules. Details are not described herein again.

Figure 15:
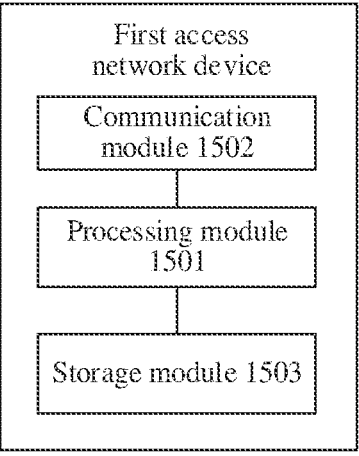
FIG. 15 is a schematic structural diagram 2 of a first access network device according to an embodiment of this application.

When an integrated unit is used, FIG. 15 is a schematic structural diagram of the first access network device provided in embodiments of this application. In FIG. 15, the first access network device includes a processing module 1501 and a communication module 1502. The processing module 1501 is configured to control and manage an action of the first access network device, for example, perform steps performed by the determining module 1402 and the processing module 1404, and/or is configured to perform another process of the technology described in this specification. The communication module 1502 is configured to support interaction between the first access network device and another device, for example, perform steps of the receiving module 1401 and the sending module 1403. As shown in FIG. 15, the first access network device may further include a storage module 1503, and the storage module 1503 is configured to store program code of the first access network device and data from a first session.

The processing module 1501 may be a processor or a controller, for example, the processor of the part 81 in FIG. 8. The communication module 1502 may be a transceiver, an RF circuit, a communication interface, or the like, and may be, for example, the radio frequency unit of the part 80 in FIG. 8. The storage module 1503 may be a memory, for example, the memory of the part 81 in FIG. 8.

Correspondingly, an embodiment of this application provides a core network device. The core network device is configured to perform the steps in the foregoing data transmission method. In this embodiment of this application, the core network device may be divided into functional modules according to the foregoing method examples. For example, each functional module may be obtained through division based on a corresponding function, or two or more functions may be integrated into one processing module. The integrated module may be implemented in a form of hardware, or may be implemented in a form of a software functional module. In this embodiment of this application, module division is an example, and is merely logical function division. In actual implementation, another division manner may be used.

Figure 16:
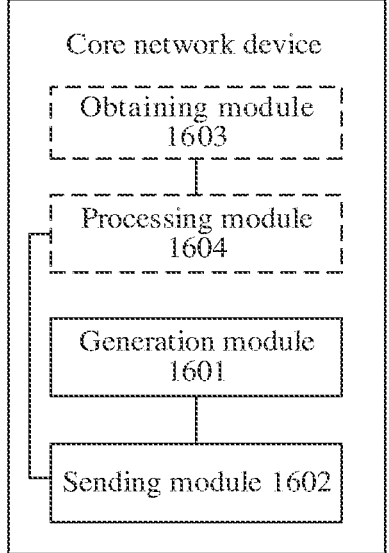
FIG. 16 is a schematic structural diagram 1 of a core network device according to an embodiment of this application.

When functional modules corresponding to functions are obtained through division, FIG. 16 is a possible schematic structural diagram of the core network device in the foregoing embodiments. As shown in FIG. 16, the core network device includes a generation module 1601 and a sending module 1602.

The generation module 1601 is configured to generate first indication information, for example, perform step 904 in the foregoing method embodiment, where the first indication information indicates a mapping relationship from a QoS flow of a first session to a radio bearer.

The sending module 1602 is configured to send the first indication information to a first access network device, for example, perform step 905 in the foregoing method embodiment.

Optionally, the core network device provided in this embodiment of this application further includes an obtaining module 1603 and a processing module 1604. The obtaining module 1603 is configured to obtain a data packet from a data server, for example, perform step 901 in the foregoing method embodiment. The processing module 1604 is configured to set a GTP-U serial number and/or a QFI serial number of a data packet from the first session, for example, perform step 902 in the foregoing method embodiment. The sending module 1602 is further configured to send the data packet to the first access network device by using the first session, for example, perform step 903 in the foregoing method embodiment.

Optionally, the sending module 1602 is further configured to send second indication information to the first access network device, for example, perform step 1301 in the foregoing method embodiment, where the second indication information indicates whether a service to which the data packet from the first session belongs is a local service, and the second indication information further indicates a local area to which the first access network device belongs.

The modules of the core network device may be further configured to perform other actions in the foregoing method embodiments. All related content of the steps in the foregoing method embodiments may be referenced to function descriptions of corresponding functional modules. Details are not described herein again.

Figure 17:
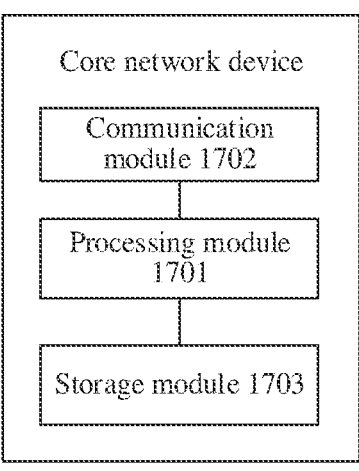
FIG. 17 is a schematic structural diagram 2 of a core network device according to an embodiment of this application.

When an integrated unit is used, FIG. 17 is a schematic structural diagram of the core network device provided in embodiments of this application. In FIG. 17, the core network device includes a processing module 1701 and a communication module 1702. The processing module 1701 is configured to control and manage an action of the core network device, for example, perform steps performed by the generation module 1601, the obtaining module 1603, and the processing module 1604, and/or is configured to perform another process of the technology described in this specification. The communication module 1702 is configured to support interaction between the core network device and another device, for example, perform steps of the sending module 1602. As shown in FIG. 17, the core network device may further include a storage module 1703, and the storage module 1703 is configured to store program code of the core network device and data obtained from a data server.

The processing module 1701 may be a processor or a controller, the communication module 1702 may be a transceiver, an RF circuit, a communication interface, or the like, and the storage module 1703 may be a memory.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer instructions are loaded and executed on a computer, all or a part of the procedures or functions according to embodiments of this application are generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a magnetic disk, or a magnetic tape), an optical medium (for example, a digital video disc (DVD)), a semiconductor medium (for example, a solid-state drive (SSD)), or the like.

Figure 18:
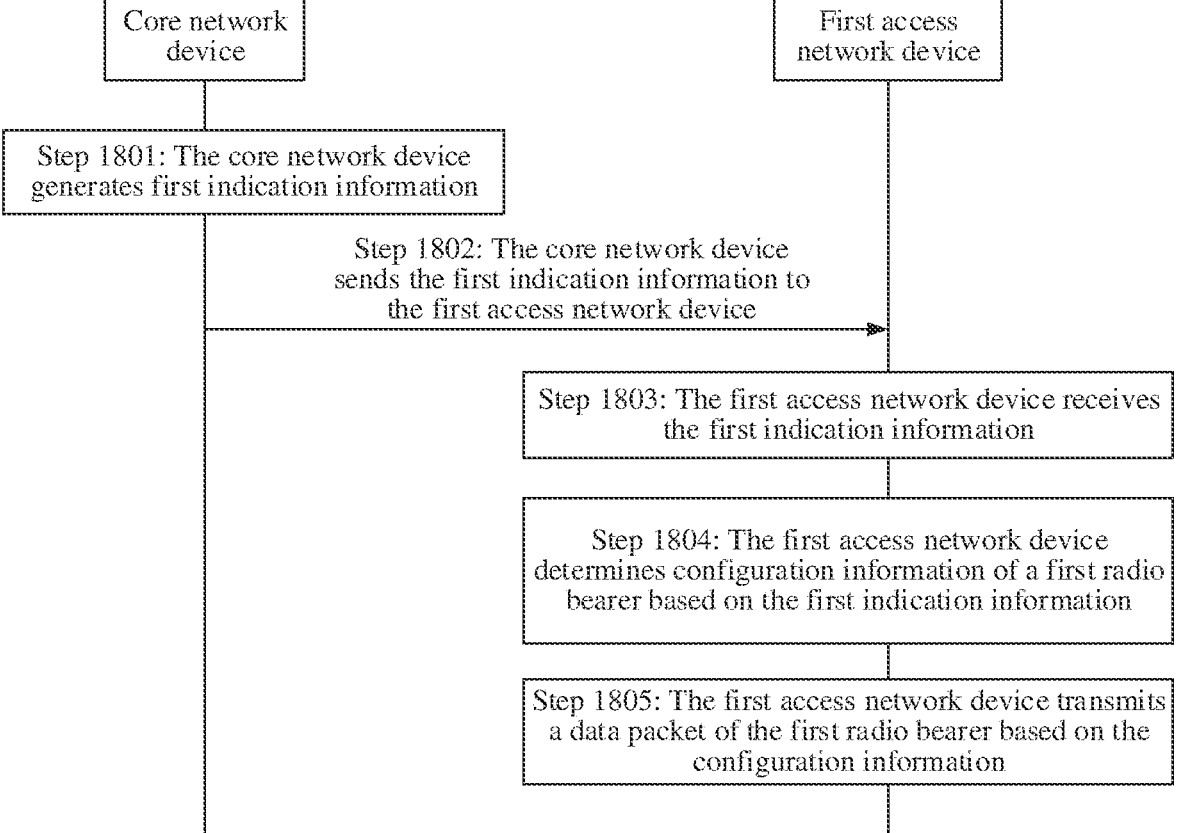
FIG. 18 is a schematic diagram 4 of a data transmission method according to an embodiment of this application.

An embodiment of this application provides a data transmission method. As shown in FIG. 18, the method includes step 1801 to step 1805.

Step 1801: A core network device generates first indication information.

The first indication information indicates configuration information of a first radio bearer.

Step 1802: The core network device sends the first indication information to a first access network device.

Optionally, the core network device may send the first indication information to the first access network device by using a session establishment/modification request message or a QoS flow establishment/modification request message, or may send the first indication information to the first access network device by using another message. This is not limited in this embodiment of this application. In addition, after the core network device establishes a first session, the core network device sends a data packet to the first access network device by using the first session.

Step 1803: The first access network device receives the first indication information.

Step 1804: The first access network device determines the configuration information of the first radio bearer based on the first indication information.

In this embodiment of this application, the data packet of the first session is mapped to the first radio bearer, that is, is transmitted by using the first radio bearer. It may be understood that the first access network device needs to establish the first radio bearer or configure the first radio bearer based on the configuration information of the first radio bearer. The configuration information of the first radio bearer may include at least one of the following: a length of a PDCP serial number, PDCP header compression configuration information, security configuration information, PDCP status reporting configuration information, a length of a PDCP discard timer, a PDCP reordering window parameter value, PDCP reestablishment configuration information, or PDCP data recovery configuration information.

The length of the PDCP serial number indicates a quantity of bits occupied by the PDCP serial number. For example, the length of the PDCP serial number may be 12 bits, 15 bits, 18 bits, or the like. The length is set based on an actual situation. This is not limited in this embodiment of this application.

The length of the PDPC serial number determines a value range of the PDCP serial number. For example, when the length of the PDCP serial number is 12 bits, the value range of the PDCP serial number is $[0, 2^{12}-1]$. When the length of the PDCP serial number is 18 bits, the value range of the PDCP serial number is $[0, 2^{18}-1]$. In addition, the length of the PDCP serial number determines a format of a PDCP PDU. The format of the PDCP PDU varies with the length of the PDCP serial number.

The PDCP header compression configuration information is configuration information used for performing PDCP compression on a data packet when the data packet is processed at a PDCP layer. The PDCP header compression configuration information may include configuration information about whether to enable a header compression function, a maximum quantity of contexts, profile information for PDCP header compression, information indicating whether to continue to perform a header compression protocol or resetting header compression in a case of PDCP reestablishment, and the like.

The security configuration information may include information such as whether to enable a security function (for example, whether to perform an encryption and decryption process, and whether to enable an integrity protection process and an integrity verification process), a key to be used, and a security algorithm to be executed.

The PDCP status reporting configuration information may include whether to enable status reporting. If the status reporting is to be enabled, the user equipment sends a PDCP status report to the access network device during PDCP reestablishment, point-to-point (PTP) handover, and point-to-multipoint (PTM) handover, or when the access network device needs to obtain the PDCP status report.

The length of the PDCP discard timer is timing duration of the discard timer. After a PDCP entity receives a PDCP SDU from an upper layer, the PDCP entity starts the discard timer. When the discard timer expires, the PDCP entity discards the PDCP SDU.

The PDCP reordering window parameter value may include at least one of a size of a reordering window, a length of a reordering timer, an upper boundary of the reordering window, and a lower boundary of the reordering window.

The PDCP reestablishment configuration information indicates whether to perform the PDCP reestablishment. If the PDCP reestablishment configuration information is that the PDCP reestablishment is not allowed, the user equipment does not perform a corresponding operation in a process in which the user equipment hands over from one access network device to another access network device.

The PDCP data recovery configuration information indicates whether to perform PDCP recovery. If the PDCP data recovery configuration information indicates that the PDCP recovery is not allowed, the user equipment does not perform a corresponding operation in a process in which the user equipment hands over from one access network device to another access network device.

In an implementation, a method for determining, by the first access network device, the configuration information of the first radio bearer based on the first indication information may include: The first indication information carries the configuration information. In this way, when the first access network device receives the first indication information, the first access network device determines the configuration information of the first radio bearer based on content of the first indication information.

Optionally, the first indication information is explicit indication information, and the first indication information includes a first mapping relationship. Alternatively, the first indication information is an index, and the index indicates the first mapping relationship. The first access network device determines the first mapping relationship based on the index. A correspondence between the index and the first mapping relationship may be preconfigured by the core network device or predefined in a protocol.

In another implementation, a method for determining, by the first access network device, the configuration information of the first radio bearer based on the first indication information may include: The first access network device determines that the first indication information satisfies a preset condition, and the first access network device determines that the configuration information of the first radio bearer is first configuration information. In this embodiment of this application, after the first access network device receives the first indication information, the first access network device determines whether the first indication information satisfies the preset condition. If the first indication information satisfies the preset condition, the first access network device determines that the configuration information of the first radio bearer is the first configuration information.

Optionally, in this embodiment of this application, the first configuration information may be configuration information specified in a protocol, or configuration information that is received by the first access network device in advance from the core network device or another access network device. This is not limited in this embodiment of this application.

Optionally, if the first indication information does not satisfy the preset condition, the first access network device does not need to determine the configuration information of the first radio bearer as the first configuration information. In this case, the first access network device may determine the configuration information of the first radio bearer by using another method (which may be an existing algorithm).

In another implementation, a method for determining, by the first access network device, the configuration information of the first radio bearer based on the first indication information may include: The first access network device determines a preset condition that the first indication information satisfies. For example, if the first indication information satisfies a preset condition 1, the first access network device determines that the configuration information of the first radio bearer is the first configuration information, if the first indication information satisfies a preset condition 2, the first access network device determines that the configuration information of the first radio bearer is second configuration information, and so on. In this case, there is a correspondence between the preset condition and the configuration information of the first radio bearer.

Optionally, in this embodiment of this application, the first configuration information and the second configuration information may be configuration information specified in a protocol, or configuration information that is received by the first access network device in advance from the core network device or another access network device. This is not limited in this embodiment of this application.

Optionally, in this embodiment of this application, the first indication information includes at least one of the following: a QoS text, a QoS identifier, or a value of a QoS parameter. The QoS identifier or the value of the QoS parameter may be carried in a first session establishment request message. The QoS identifier may include a 5G quality of service identifier (namely, a 5QI), and the QoS parameter includes at least one of the following: a resource type, a priority, a maximum data burst volume, a packet delay budget, or a packet bit error rate. Optionally, the value of the QoS parameter may be a value of the foregoing existing QoS parameter, or the value of the QoS parameter may be a value of a newly defined QoS parameter in this embodiment of this application. The value may be selected based on an actual requirement. This is not limited herein.

For content of the first indication information, the preset condition may be that the QoS identifier satisfies a condition or the value of the QoS parameter satisfies a condition. Optionally, the preset condition may be configured for a base station by using the core network device or predefined in a protocol.

For example, the QoS identifier is the 5QI. The preset condition may be that the 5QI of the data packet is equal to a preset value. For example, the preset condition is that the 5QI of the data packet is equal to 73. After the first access network device receives the first indication information, the first access network device obtains the 5QI from the first indication information, then the first access network device determines whether the 5QI carried in the first indication information is equal to 73, and the first access network device determines that the configuration information of the first radio bearer is the first configuration information when the 5QI in the first indication information is equal to 73.

For example, the QoS parameter is the resource type. The preset condition may be that the resource type is a preset resource type. After the first access network device receives the first indication information, the first access network device obtains the resource type from the first indication information, then the first access network device determines whether the resource type carried in the first indication information is the preset resource type, and the first access network device determines that the configuration information of the first radio bearer is the first configuration information when the resource type in the first indication information is the preset resource type.

For example, the QoS parameter is the maximum data burst volume. The preset condition may alternatively be that the maximum data burst volume is less than a preset threshold. After the first access network device receives the first indication information, the first access network device obtains the maximum data burst volume from the first indication information, then the first access network device determines whether the maximum data burst volume carried in the first indication information is less than the preset threshold, and the first access network device determines that the configuration information of the first radio bearer is the first configuration information when the maximum data burst volume in the first indication information is less than the preset threshold.

It should be noted that, a value relationship in the preset condition herein is merely an example, and is not strictly limited. For example, a case in which the preset condition is that a QoS parameter is greater than, less than, equal to, greater than or equal to, or less than or equal to a value falls within the protection scope of this embodiment.

Step 1805: The first access network device transmits the data packet of the first radio bearer based on the configuration information.

It should be understood that in this embodiment of this application, transmitting a data packet may include at least one of sending a data packet, receiving a data packet, processing a data packet before sending the data packet, or processing a data packet after receiving the data packet. The data packet of the first radio bearer refers to a data packet transmitted by using the first radio bearer. "Performing transmission based on the configuration information" may be understood as that the data packet needs to be processed based on the configuration information when the data packet is transmitted by using the first radio bearer. Details are as follows.

For example, the transmitting the data packet of the first radio bearer based on the length of the PDCP serial number includes: performing packet assembling or unpacking on the data packet of the first radio bearer based on the length of the PDCP serial number of the first radio bearer.

The transmitting the data packet of the first radio bearer based on the PDCP header compression configuration information includes: determining, based on the PDPC header compression configuration information, whether to perform header compression on the data packet of the first radio bearer, and when it is determined to perform header compression on the data packet of the first radio bearer, further performing header compression on the data packet of the first radio bearer based on an indicated maximum quantity of contexts and a header compression profile, and the like.

The transmitting the data packet of the first radio bearer based on the security configuration information includes: determining, based on the security configuration information, whether to enable a security function (for example, whether to perform an encryption and decryption process, and whether to enable an integrity protection process and an integrity verification process); and when the security function is enabled, performing encryption and decryption on the data packet of the first radio bearer based on a key or a security algorithm indicated in the security configuration information, or performing integrity protection and integrity verification on the data packet of the first radio bearer.

The transmitting the data packet of the first radio bearer based on the PDCP status reporting configuration information includes: determining, based on the PDCP status reporting configuration information, whether to enable status reporting in a process of transmitting the data packet of the first bearer. If the PDCP status reporting configuration information indicates to enable the status reporting, the user equipment needs to send the PDCP status report to the access network device in a process of transmitting the first radio bearer.

The transmitting the data packet of the first radio bearer based on the length of the PDCP discard timer includes: A PDCP entity discards, based on the length of the discard timer, a received PDCP SDU of the first radio bearer when the discard timer expires.

The transmitting the data packet of the first radio bearer based on the PDCP reordering window parameter value includes: transmitting the data packet of the first radio bearer based on at least one of a size of a reordering window, a length of a reordering timer, an upper boundary of the reordering window, or a lower boundary of the reordering window.

The transmitting the data packet of the first radio bearer based on the PDCP reestablishment configuration information includes: in a process of transmitting the data packet of the first radio bearer, determining, based on the PDCP reestablishment configuration information, whether to perform PDCP reestablishment. If the PDCP reestablishment configuration information is that the PDCP reestablishment is not allowed, in a process of transmitting the data packet of the first radio bearer, the user equipment does not perform a PDCP reestablishment operation in a process in which the user equipment hands over from one access network device to another access network device.

The transmitting the data packet of the first radio bearer based on the PDCP data recovery configuration information includes: in a process of transmitting the data packet of the first radio bearer, determining, based on the PDCP data recovery configuration information, whether to perform PDCP recovery. If the PDCP data recovery configuration information is that the PDCP recovery is not allowed, in a process of transmitting the data packet of the first radio bearer, the user equipment does not perform a PDCP recovery operation in a process in which the user equipment hands over from one access network device to another access network device.

It should be noted that, if configuration information of radio bearers of different access network devices is different, for a same data packet, when the different access network devices transmit the data packet based on the configuration information of the radio bearers, processing manners for the data packet may be different.

In this embodiment of this application, the core network device sends, according to the foregoing method, the configuration information of the first radio bearer to a plurality of access network devices that communicate with the core network device. In this case, the configuration information of radio bearers of the different access network devices is the same. In other words, the different access network devices transmit the data packet of the first radio bearer based on the same configuration information, so that lost data packets can be reduced. For example, for a same data packet, a length of a PDCP serial number of the data packet transmitted by the first access network device is the same as a length of a PDCP serial number of the data packet transmitted by a second access network device. If the user equipment hands over from the first access network device to the second access network device, it can be ensured that the second access network device performs packet assembling or unpacking on the data packet based on a PDCP PDU format that is the same as that of the first access network device, so that the data packet is successfully transmitted without loss.

In conclusion, according to the data transmission method provided in embodiments of this application, the core network device may send the first indication information to the first access network device. Then, after receiving the first indication information, the first access network device determines the configuration information of the first radio bearer based on the first indication information, and the first access network device transmits the data packet of the first radio bearer based on the configuration information. An access network device in a communication system transmits a data packet according to the data transmission method provided in embodiments of this application, so that data packets lost in a handover process of the user equipment can be reduced, thereby providing a better communication service for the user equipment.

In an implementation, before the core network device sends the first indication information to the first access network device, the data transmission method provided in embodiments of this application may further include: The core network device receives second indication information from the second access network device, where the second indication information indicates configuration information configured for a radio bearer of the second access network device (or referred to as configuration information of a PDCP of the second access network device).

Correspondingly, a method for generating the first indication information by the core network device includes: The core network device generates the first indication information based on the second indication information. In this way, the core network device sends the first indication information to the first access network device, so that the configuration information of the radio bearer of the first access network device can be the same as the configuration information of the radio bearer of the second access network device. In this way, when the user equipment hands over between the first access network device and the second access network device, data can be forwarded based on transmission progresses of different access network devices, so that lost data packets are reduced, thereby providing a better communication service for the user equipment.

Correspondingly, an embodiment of this application provides a first access network device. The first access network device is configured to perform the steps in the foregoing data transmission method. In this embodiment of this application, the first access network device may be divided into functional modules based on the foregoing method examples. For example, each functional module may be obtained through division based on each corresponding function, or two or more functions may be integrated into one processing module. The integrated module may be implemented in a form of hardware, or may be implemented in a form of a software functional module. In embodiments of this application, module division is an example, and is merely logical function division. In actual implementation, another division manner may be used.

Figure 19:
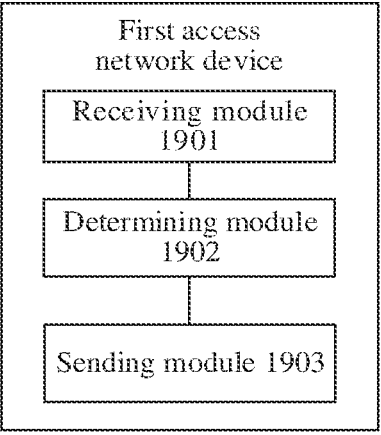
FIG. 19 is a schematic structural diagram 3 of a first access network device according to an embodiment of this application.

When functional modules corresponding to functions are obtained through division, FIG. 19 is a possible schematic structural diagram of the first access network device in the foregoing embodiments. As shown in FIG. 19, the first access network device includes a receiving module 1901, a determining module 1902, and a sending module 1903.

The receiving module 1901 is configured to receive first indication information, for example, perform step 1803 in the foregoing method embodiment.

The determining module 1902 is configured to determine configuration information of a first radio bearer based on the first indication information, for example, perform step 1804 in the foregoing method embodiment.

The sending module 1903 is configured to transmit a data packet of the first radio bearer based on the configuration information, for example, perform step 1805 in the foregoing method embodiment.

The modules of the first access network device may be further configured to perform other actions in the foregoing method embodiments. All related content of the steps in the foregoing method embodiments may be referenced to function descriptions of corresponding functional modules. Details are not described herein again.

Figure 20:
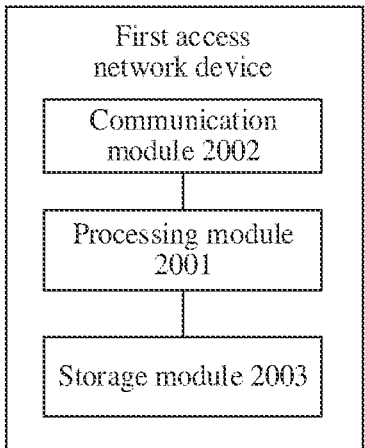
FIG. 20 is a schematic structural diagram 4 of a first access network device according to an embodiment of this application.

When an integrated unit is used, FIG. 20 is a schematic structural diagram of the first access network device provided in embodiments of this application. In FIG. 20, the first access network device includes a processing module 2001 and a communication module 2002. The processing module 2001 is configured to control and manage an action of the first access network device, for example, perform steps performed by the determining module 1902, and/or is configured to perform another process of the technology described in this specification. The communication module 2002 is configured to support interaction between the first access network device and another device, for example, perform steps of the receiving module 1901 and the sending module 1903. As shown in FIG. 20, the first access network device may further include a storage module 2003, and the storage module 2003 is configured to store program code of the first access network device and a data packet of a first radio bearer.

The processing module 2001 may be a processor or a controller, for example, the processor of the part 81 in FIG. 8. The communication module 2002 may be a transceiver, an RF circuit, a communication interface, or the like, and may be, for example, the radio frequency unit of the part 80 in FIG. 8. The storage module 2003 may be a memory, for example, the memory of the part 81 in FIG. 8.

Correspondingly, an embodiment of this application provides a core network device. The core network device is configured to perform the steps in the foregoing data transmission method. In this embodiment of this application, the core network device may be divided into functional modules according to the foregoing method examples. For example, each functional module may be obtained through division based on a corresponding function, or two or more functions may be integrated into one processing module. The integrated module may be implemented in a form of hardware, or may be implemented in a form of a software functional module. In this embodiment of this application, module division is an example, and is merely logical function division. In actual implementation, another division manner may be used.

Figure 21:
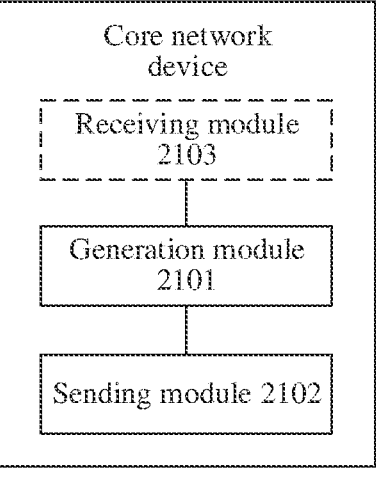
FIG. 21 is a schematic structural diagram 3 of a core network device according to an embodiment of this application.

When functional modules corresponding to functions are obtained through division, FIG. 21 is a possible schematic structural diagram of the core network device in the foregoing embodiment. As shown in FIG. 21, the core network device includes a generation module 2101 and a sending module 2102.

The generation module 2101 is configured to generate first indication information, for example, perform step 1801 in the foregoing method embodiment, where the first indication information indicates configuration information of a first radio bearer.

The sending module 2102 is configured to send the first indication information to a first access network device, for example, perform step 1802 in the foregoing method embodiment.

Optionally, the core network device provided in this embodiment of this application further includes a receiving module 2103. The receiving module 2103 is configured to receive second indication information from a second access network device, where the second indication information indicates configuration information of a radio bearer configured for the second access network device.

The modules of the core network device may be further configured to perform other actions in the foregoing method embodiments. All related content of the steps in the foregoing method embodiments may be referenced to function descriptions of corresponding functional modules. Details are not described herein again.

Figure 22:
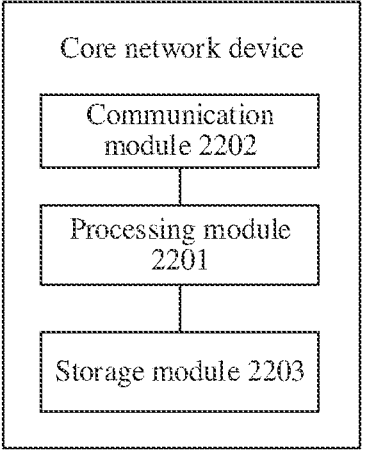
FIG. 22 is a schematic structural diagram 4 of a core network device according to an embodiment of this application.

When an integrated unit is used, FIG. 22 is a schematic structural diagram of the core network device provided in embodiments of this application. In FIG. 22, the core network device includes a processing module 2201 and a communication module 2202. The processing module 2201 is configured to control and manage an action of the core network device, for example, perform steps performed by the generation module 2101, and/or configured to perform another process of the technology described in this specification. The communication module 2202 is configured to support interaction between the core network device and another device, for example, perform steps of the sending module 2102 and the receiving module 2103. As shown in FIG. 22, the core network device may further include a storage module 2203, and the storage module 2203 is configured to store program code and the like of the core network device.

The processing module 2201 may be a processor or a controller, the communication module 2202 may be a transceiver, an RF circuit, a communication interface, or the like, and the storage module 2203 may be a memory.

All or some of the foregoing embodiments may be implemented by using software, hardware, firmware, or any combination thereof. When a software program is used to implement embodiments, embodiments may be implemented completely or partially in a form of a computer program product. The computer program product includes one or more computer instructions. When the computer instructions are loaded and executed on a computer, all or a part of the procedures or functions according to embodiments of this application are generated. The computer may be a general-purpose computer, a dedicated computer, a computer network, or other programmable apparatuses. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a DSL) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, an SSD), or the like.

The foregoing descriptions about implementations allow a person skilled in the art to clearly understand that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the modules or units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate components may or may not be physically separate, and components displayed as units may or may not be physical units. In some embodiments, the components may be located at one position, or may be distributed on a plurality of network units. Some or all of the units may be selected based on actual requirements to achieve the objectives of the solutions in the embodiments.

In addition, functional units in embodiments of this application may be integrated into one processing unit, each of the units may exist independently physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the prior art, or all or some of the technical solutions may be implemented in the form of a software product. The computer software product is stored in a storage medium and includes several instructions for instructing a computer device (which may be a personal computer, a server, or a network device) or a processor to perform all or some of the steps of the methods described in embodiments of this application. The foregoing storage medium includes any medium that can store program code, such as a flash memory, a removable hard disk, a read-only memory, a random access memory, a magnetic disk, or an optical disc.

The foregoing descriptions are merely example embodiments, but are not intended to limit the protection scope of the present disclosure. Any variation or replacement readily figured out by a person skilled in the art within the technical scope disclosed shall fall within the protection scope of the present specification and claims.

We claim:

1. A data transmission method, comprising:
receiving, by a first access network device, local service indication information and a service identifier from a core network device, wherein the local service indication information indicates that a service to which a data packet of a first session belongs is a local service, wherein the local service indication information is received to reduce data packets lost in a handover process of user equipment;
sending, by the first access network device, third indication information to a second access network device, wherein the third indication information indicates that the service is the local service; and
determining, by the first access network device based on the third indication information, whether the second access network device belongs to a same local area of the local service as the first access network device.

2. The data transmission method according to claim 1, further comprising:
receiving, by the first access network device, local area information from the core network device, wherein the local area information comprises a cell identifier, a tracking area identifier, or a base station identifier associated with at least one local area corresponding to the local service.

3. The data transmission method according to claim 1, wherein
receiving, by the first access network device, indication information from the core network device that indicates a local area to which the first access network device belongs.

4. The data transmission method according to claim 1, wherein
the third indication information further indicates a local area to which the first access network device belongs.

5. The data transmission method according to claim 1, wherein
the sending, by the first access network device, the third indication information to the second access network device comprises:
sending, by the first access network device, the third indication information to the second access network device in response to a terminal device being handed over from the first access network device to the second access network device.

6. A data transmission method, comprising:
generating, by a core network device, first indication information indicating a mapping relationship from a quality of service (QoS) flow of a first session to a radio bearer;
sending, by the core network device, local service indication information and a service identifier to a first access network device, wherein the local service indication information indicates that a service to which a data packet of the first session belongs is a local service; and
sending, by the core network device, local area information to the first access network device, wherein the local area information comprises a cell identifier, a tracking area identifier, or a base station identifier associated with at least one local area corresponding to the local service,
wherein when the first access network device and a second access network device belong to a same local area of the local service, the core network device sets general packet radio service tunneling protocol user plane (GTP-U) serial numbers of same data packets sent to the first access network device and the second access network device to be the same.

7. The data transmission method according to claim 6, wherein
the core network device sends, to the first access network device, indication information that indicates a local area to which the first access network device belongs.

8. A data transmission method, comprising:
receiving, by a second access network device, third indication information from a first access network device, wherein the third indication information indicates that a service to which a data packet of a first session belongs is a local service, and indicates a local area to which the first access network device belongs;
determining, by the second access network device based on the third indication information, that the local area to which the first access network device belongs and a local area to which the second access network device belongs are different local areas; and in response to the local area to which the first access network device belongs and the local area to which the second access network device belongs being different local areas, determining, by the second access network device, to skip performing a data forwarding procedure for the first session.

9. The data transmission method according to claim 8, further comprising:

allocating, to the first access network device, forwarding tunnel information used for data forwarding; and configuring a packet data convergence protocol status report in a handover request acknowledgment message.

10. An apparatus, comprising:

one or more processors configured to:

receive local service indication information and a service identifier from a core network device, wherein the local service indication information indicates that a service to which a data packet of a first session belongs is a local service, wherein the local service indication information is received to reduce data packets lost in a handover process of user equipment;

send third indication information to a second access network device, wherein the third indication information indicates that the service is the local service; and determine, based on the third indication information, whether the second access network device belongs to a same local area of the local service as the apparatus.

11. The apparatus according to claim 10, wherein the one or more processors are further configured to:

receive local area information from the core network device, wherein the local area information comprises a cell identifier, a tracking area identifier, or a base station identifier associated with at least one local area corresponding to the local service.

12. The apparatus according to claim 10, wherein the one or more processors are further configured to:

receive indication information from the core network device that indicates a local area to which the apparatus belongs.

13. The apparatus according to claim 10, wherein the third indication information further indicates a local area to which the apparatus belongs.

14. The apparatus according to claim 10, wherein the one or more processors send the third indication information to the second access network device by:

sending the third indication information to the second access network device in response to a terminal device being handed over from the apparatus to the second access network device.

15. An apparatus, comprising:

one or more processors configured to:

generate first indication information indicating a mapping relationship from a quality of service (QoS) flow of a first session to a radio bearer;

send local service indication information and a service identifier to a first access network device, wherein the local service indication information indicates that a service to which a data packet of the first session belongs is a local service; and send local area information to the first access network device, wherein the local area information comprises a cell identifier, a tracking area identifier, or a base station identifier associated with at least one local area corresponding to the local service, wherein when the first access network device and a second access network device belong to a same local area of the local service, the apparatus sets general packet radio service tunneling protocol user plane (GTP-U) serial numbers of same data packets sent to the first access network device and the second access network device to be the same.

16. The apparatus according to claim 15, wherein the one or more processors are further configured to:

send to the first access network device, indication information that indicates a local area to which the first access network device belongs.

17. An apparatus, comprising:

one or more processors configured to:

receive third indication information from a first access network device, wherein the third indication information indicates that a service to which a data packet of a first session belongs is a local service, and indicates a local area to which the first access network device belongs;

determine, based on the third indication information, that the local area to which the first access network device belongs and a local area to which the apparatus belongs are different local areas; and in response to the local area to which the first access network device belongs and the local area to which the apparatus belongs being different local areas, determine to skip performing a data forwarding procedure for the first session.

18. The apparatus according to claim 17, wherein the one of more processors are further configured to:

allocate, to the first access network device, forwarding tunnel information used for data forwarding; and configure a packet data convergence protocol status report in a handover request acknowledgment message.

\* \* \* \* \*